US008356275B2

(12) United States Patent
Nagaoka

(10) Patent No.: US 8,356,275 B2
(45) Date of Patent: Jan. 15, 2013

(54) PROGRAM AND METHOD FOR DISPLAYING RELATIONSHIPS BETWEEN OBJECTS

(75) Inventor: Yasuyuki Nagaoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 981 days.

(21) Appl. No.: 12/172,622

(22) Filed: Jul. 14, 2008

(65) Prior Publication Data

US 2008/0276217 A1 Nov. 6, 2008

Related U.S. Application Data

(63) Continuation of application No. PCT/JP2006/301668, filed on Feb. 1, 2006.

(51) Int. Cl.
*G06F 9/44* (2006.01)
(52) U.S. Cl. ........................................ 717/105
(58) Field of Classification Search ................ 382/190; 707/748, 778; 717/105, 120, 109, 123, 168, 717/169, 172, 174–176, 178; 715/738
See application file for complete search history.

(56) References Cited

U.S. PATENT DOCUMENTS

| | | | | |
|---|---|---|---|---|
| 7,552,430 B2 * | 6/2009 | Napier et al. | | 717/169 |
| 7,562,356 B2 * | 7/2009 | DeFolo | | 717/169 |
| 7,603,668 B2 * | 10/2009 | Zweifel et al. | | 717/174 |
| 7,765,538 B2 * | 7/2010 | Zweifel et al. | | 717/168 |
| 7,853,609 B2 * | 12/2010 | Dehghan et al. | | 707/778 |
| 2002/0112230 A1 * | 8/2002 | Scott | | 717/169 |
| 2002/0144254 A1 | 10/2002 | Owada | | |
| 2003/0033597 A1 * | 2/2003 | Allsop et al. | | 717/169 |
| 2003/0218628 A1 * | 11/2003 | Deshpande et al. | | 345/738 |
| 2004/0073900 A1 | 4/2004 | Scott | | |
| 2004/0250265 A1 | 12/2004 | Suzuki et al. | | |
| 2005/0132283 A1 | 6/2005 | Diwan et al. | | |
| 2005/0132382 A1 | 6/2005 | McGuire et al. | | |
| 2006/0136906 A1 * | 6/2006 | Hughes et al. | | 717/174 |
| 2006/0218528 A1 * | 9/2006 | Lerner et al. | | 717/120 |
| 2007/0113225 A1 * | 5/2007 | Felts | | 717/172 |

(Continued)

FOREIGN PATENT DOCUMENTS

EP 1 246 057 A2 10/2002

(Continued)

OTHER PUBLICATIONS

Create ultimate windows XP original CD/DVD installable under most recent environment; PC Japan, Softbank Publishing, Inc. Apr. 1, 2004; vol. 9, No. 4, pp. 42-47.

(Continued)

*Primary Examiner* — Don Wong
*Assistant Examiner* — Daxin Wu
(74) *Attorney, Agent, or Firm* — Fujitsu Patent Center

(57) ABSTRACT

A computer program that provides users with an easy-to-understand overall view of relationships between objects. A data loader reads relationship information out of an object descriptor database and loads view-related object descriptors into a working memory, where the relationship information describes relationships between objects. A data sorter sorts the view-related object descriptors in the working memory into groups, based on their absorption, dependence, and exclusion relationships described in the relationship information. This sorting process yields a hierarchy of view-related object descriptors according to their absorption relationships. A hierarchy view data builder retrieves view-related object descriptors, along with link descriptors, from the working memory according to a structure tree that represents inter-object relationships. The hierarchy view data builder saves the retrieved view-related object descriptors in a tree hierarchy database.

9 Claims, 17 Drawing Sheets

U.S. PATENT DOCUMENTS

| | | | |
|---|---|---|---|
| 2007/0162460 A1* | 7/2007 | Long | 707/10 |
| 2008/0201701 A1* | 8/2008 | Hofhansl et al. | 717/168 |
| 2008/0320473 A1* | 12/2008 | Laska et al. | 717/178 |

FOREIGN PATENT DOCUMENTS

| | | |
|---|---|---|
| JP | 02-173822 | 7/1990 |
| JP | A 2001-325096 | 11/2001 |
| JP | A 2002-140716 | 5/2002 |
| JP | A 2002-297390 | 10/2002 |
| JP | 2004-102379 | 4/2004 |
| JP | A 2004-102379 | 4/2004 |
| JP | 2004-295181 | 10/2004 |
| JP | A 2004-341820 | 12/2004 |
| JP | A 2005-276058 | 10/2005 |
| JP | 2007-514232 | 5/2007 |

OTHER PUBLICATIONS

Japanese Office Action issued in corresponding Japanese App. No. 2007-556740, issued Sep. 13, 2011.

Satoru Toda, "Application Power Up," Nikkei Win PC, Nikkei Business Publications Inc., vol. 5, No. 1, pp. 244-247.

Keiichiro Kyoma, "Security taisaku no Yoten Dai 3 Kai (Security Points $3^{rd}$ report)" Nikkei Network, Nikkei Business Publications, Inc., vol. 56, pp. 131-135. Nov. 2004.

Japanese Office Action mailed Mar. 13, 2012 for corresponding Japanese Application No. 2007-556740, with partial English-language translation.

\* cited by examiner

FIG. 5

PATCH DESCRIPTORS 400

| PATCH ID | RELEASE STATUS | BAD PATCH | ABSORBED PATCH | DEPENDED-UPON PATCH | EXCLUSIVE PATCH | DESCRIPTION |
|---|---|---|---|---|---|---|
| | 401 | 402 403 | 404 | 405 | 406 | 407 |
| 1111-08 | - | - | - | - | - | SnOS 5.10 xxxxx patch |
| 1111-09 | - | - | - | - | - | SnOS 5.10 xxxxx patch |
| 1111-10 | - | B | 1222-02,1333-02,1444-01 | - | - | SnOS 5.10 xxxxx patch |
| 1111-11 | A | - | 1222-02,1333-02,1444-01 | 1555-02,1666-09 | 1777-02,1888-02 | SnOS 5.10 xxxxx patch |
| 1222-01 | - | - | 1233-05 | - | - | SnOS 5.10 aaa driver patch |
| 1222-02 | - | B | 1233-05 | - | - | SnOS 5.10 aaa driver patch |
| 1233-03 | - | - | - | - | - | ... |
| 1233-04 | - | B | 1234-01 | - | - | |
| 1233-05 | - | - | - | - | - | |
| 1234-01 | - | - | - | - | - | |
| 1333-01 | - | B | - | - | - | |
| 1333-02 | - | - | - | - | - | |
| 1444-01 | - | - | - | - | - | |
| 1555-02 | A | - | - | 1566-02,1577-05,1588-02 | - | |
| 1566-02 | A | - | - | 1567-02 | - | |
| 1567-02 | A | - | - | - | - | |
| 1577-04 | - | - | - | 1579-03 | - | |
| 1577-05 | A | - | 1578-03 | - | - | |
| 1578-03 | - | B | 1579-03 | - | - | |
| 1579-03 | - | - | - | - | - | |
| 1588-02 | A | - | - | 1677-05 | - | |
| 1666-09 | A | - | - | - | - | |
| 1677-05 | A | - | - | - | - | |
| 1777-02 | A | - | - | - | - | |
| 1888-02 | A | - | - | - | - | |

FIG. 7

PATCH DESCRIPTORS (IN WORKING MEMORY) AFTER SORT 500a

| PATCH ID | RELEASE STATUS | BAD PATCH | ABSORBED PATCH | DEPENDED-UPON PATCH | EXCLUSIVE PATCH | LINK DESCRIPTOR |
|---|---|---|---|---|---|---|
| 1111-11 | A | - | 1222-02,1333-02,1444-01 | 1555-02,1666-09 | 1777-02,1888-02 | □ |
| 1111-10 | - | B | 1222-02,1333-02,1444-01 | - | - | □ |
| 1111-09 | - | - | - | - | - | □ |
| 1111-08 | - | - | - | - | - | □ |
| 1222-02 | - | B | 1233-05 | - | - | □ |
| 1222-01 | - | - | 1233-05 | - | - | □ |
| 1233-05 | - | - | 1234-01 | - | - | □ |
| 1233-04 | - | B | - | - | - | □ |
| 1233-03 | - | - | - | - | - | □ |
| 1234-01 | - | - | - | - | - | □ |
| 1333-02 | - | B | - | - | - | □ |
| 1333-01 | - | - | - | - | - | □ |
| 1444-01 | - | - | - | - | - | □ |
| 1555-02 | A | - | - | 1566-02,1577-05,1588-02 | - | □ |
| 1566-02 | A | - | - | 1567-02 | - | □ |
| 1567-02 | A | - | - | - | - | □ |
| 1577-05 | A | - | 1578-03 | 1579-03 | - | □ |
| 1577-04 | - | - | - | - | - | □ |
| 1578-03 | - | B | 1579-03 | - | - | □ |
| 1579-03 | - | - | - | - | - | □ |
| 1588-02 | A | - | - | - | - | □ |
| 1666-09 | A | - | - | 1677-05 | - | □ |
| 1677-05 | A | - | - | - | - | □ |
| 1777-02 | A | - | - | - | - | □ |
| 1888-02 | A | - | - | - | - | □ |

510 GROUP A
511 GROUP B
512 GROUP C
513 GROUP D

FIG. 8

PATCH DESCRIPTORS (IN WORKING MEMORY) AFTER ABSORPTION-BASED SORT

| PATCH ID | RELEASE STATUS | BAD PATCH | ABSORBED PATCH | DEPENDED-UPON PATCH | EXCLUSIVE PATCH | LINK DESCRIPTOR |
|---|---|---|---|---|---|---|
| 1111-11 | A | - | 1222-02,1333-02,1444-01 | 1555-02,1666-09 | 1777-02,1888-02 | |
| 1111-10 | - | B | 1222-02,1333-02,1444-01 | - | - | |
| 1222-02 | - | B | 1233-05 | - | - | |
| 1222-01 | - | - | 1233-05 | - | - | |
| 1233-05 | - | - | 1234-01 | - | - | |
| 1234-01 | - | - | - | - | - | |
| 1233-04 | - | B | - | - | - | |
| 1233-03 | - | - | - | - | - | |
| 1333-02 | - | B | - | - | - | |
| 1333-01 | - | - | - | - | - | |
| 1444-01 | - | - | - | - | - | |
| 1111-09 | - | - | - | - | - | |
| 1111-08 | - | - | - | - | - | |
| 1555-02 | A | - | - | 1566-02,1577-05,1588-02 | - | |
| 1566-02 | A | - | - | 1567-02 | - | |
| 1577-05 | A | - | 1578-03 | 1579-03 | - | |
| 1577-04 | - | - | - | - | - | |
| 1578-03 | - | B | 1579-03 | - | - | |
| 1579-03 | - | - | - | - | - | |
| 1567-02 | A | - | - | - | - | |
| 1588-02 | A | - | - | - | - | |
| 1666-09 | A | - | - | 1677-05 | - | |
| 1677-05 | A | - | - | - | - | |
| 1777-02 | A | - | - | - | - | |
| 1888-02 | A | - | - | - | - | |

PATCH DESCRIPTORS (IN WORKING MEMORY)
AFTER DEPENDENCE-BASED SORT

FIG. 9

| PATCH ID | RELEASE STATUS | BAD PATCH | ABSORBED PATCH | DEPENDED-UPON PATCH | EXCLUSIVE PATCH | LINK DESCRIPTOR |
|---|---|---|---|---|---|---|
| 1111-11 | A | - | 1222-02,1333-02,1444-01 | 1555-02,1666-09 | 1777-02,1888-02 | □ |
| 1111-10 | - | B | 1222-02,1333-02,1444-01 | - | - | ↑ |
| 1222-02 | - | B | 1233-05 | - | - | ↑ |
| 1222-01 | - | - | 1233-05 | - | - | ↑ |
| 1233-05 | - | - | 1234-01 | - | - | ↑ |
| 1234-01 | - | - | - | - | - | ↑ |
| 1233-04 | - | B | - | - | - | ↑ |
| 1233-03 | - | - | - | - | - | ↑ |
| 1333-02 | - | - | - | - | - | ↑ |
| 1333-01 | - | B | - | - | - | ↑ |
| 1444-01 | - | - | - | - | - | ↑ |
| 1111-09 | - | - | - | - | - | ↑ |
| 1111-08 | - | - | - | - | - | ↑ |
| 1555-02 | A | - | - | 1566-02,1577-05,1588-02 | - | □↑ |
| 1566-02 | A | - | - | 1567-02 | - | ↑ |
| 1567-02 | A | - | - | - | - | ↑ |
| 1577-05 | A | - | 1578-03 | 1579-03 | - | □↑ |
| 1577-04 | - | - | 1579-03 | - | - | ↑ |
| 1578-03 | - | B | - | - | - | ↑ |
| 1579-03 | - | - | - | - | - | □ |
| 1588-02 | A | - | - | 1677-05 | - | □↑ |
| 1666-09 | A | - | - | - | - | ↑ |
| 1677-05 | A | - | - | - | - | □ |
| 1777-02 | A | - | - | - | - | □ |
| 1888-02 | A | - | - | - | - | □ |

FIG. 10

PATCH DESCRIPTORS (IN WORKING MEMORY) AFTER EXCLUSION-BASED SORT

| PATCH ID | RELEASE STATUS | BAD PATCH | ABSORBED PATCH | DEPENDED-UPON PATCH | EXCLUSIVE PATCH | LINK DESCRIPTOR |
|---|---|---|---|---|---|---|
| 1111-11 | A | - | 1222-02,1333-02,1444-01 | 1555-02,1666-09 | 1777-02,1888-02 | □ |
| 1111-10 | - | B | 1222-02,1333-02,1444-01 | - | - | ↑ |
| 1222-02 | - | B | 1233-05 | - | - | ↑ |
| 1222-01 | - | - | 1233-05 | - | - | ↑ |
| 1233-05 | - | - | 1234-01 | - | - | ↑ |
| 1234-01 | - | - | - | - | - | ↑ |
| 1233-04 | - | B | - | - | - | ↑ |
| 1233-03 | - | - | - | - | - | ↑ |
| 1233-02 | - | - | - | - | - | ↑ |
| 1333-01 | - | B | - | - | - | ↑ |
| 1444-01 | - | - | - | - | - | ↑ |
| 1111-09 | - | - | - | - | - | ↑ |
| 1111-08 | - | - | - | - | - | ↑ |
| 1555-02 | A | - | - | 1566-02,1577-05,1588-02 | - | ↑□ |
| 1566-02 | A | - | - | 1567-02 | - | ↑□ |
| 1567-02 | A | - | - | - | - | ↑□ |
| 1577-05 | A | - | 1578-03 | 1579-03 | - | ↑□ |
| 1577-04 | - | - | 1579-03 | - | - | ↑ |
| 1578-03 | - | B | - | - | - | ↑ |
| 1579-03 | - | - | - | - | - | ↑ |
| 1588-02 | A | - | - | 1677-05 | - | ↑□ |
| 1666-09 | A | - | - | - | - | ↑□ |
| 1677-05 | A | - | - | - | - | ↑□ |
| 1777-02 | A | - | - | - | - | × |
| 1888-02 | A | - | - | - | - | × |

FIG. 11

PATCH DESCRIPTORS (IN WORKING MEMORY) AFTER LINK CHARACTER REPLACEMENT 500e

| PATCH ID | RELEASE STATUS | BAD PATCH | ABSORBED PATCH | DEPENDED-UPON PATCH | EXCLUSIVE PATCH | LINK DESCRIPTOR |
|---|---|---|---|---|---|---|
| 1111-11 | A | – | 1222-02,1333-02,1444-01 | 1555-02,1666-09 | 1777-02,1888-02 | ⊢□ |
| 1111-10 | – | B | 1222-02,1333-02,1444-01 | – | – | ⊢⊥ |
| 1222-02 | – | B | 1233-05 | – | – | ⊢⊥ |
| 1222-01 | – | – | 1233-05 | – | – | ⊢⊥ |
| 1233-05 | – | – | 1234-01 | – | – | ⊢⊥ |
| 1234-01 | – | – | – | – | – | ⊢⊥ |
| 1233-04 | – | B | – | – | – | ⊢⊥ |
| 1233-03 | – | – | – | – | – | ⊢⊥ |
| 1333-02 | – | – | – | – | – | ⊢⊥ |
| 1333-01 | – | B | – | – | – | ⊢⊥ |
| 1444-01 | – | – | – | – | – | ⊢⊥ |
| 1111-09 | – | – | – | – | – | ⊢⊥ |
| 1111-08 | – | – | – | – | – | ⊢⊥ |
| 1555-02 | A | – | – | 1566-02,1577-05,1588-02 | – | ↑□ |
| 1566-02 | A | – | – | 1567-02 | – | ↑□ |
| 1567-02 | A | – | – | – | – | ↑□ |
| 1577-05 | A | – | 1578-03 | 1579-03 | – | ↑□ |
| 1577-04 | – | – | – | – | – | ↑L |
| 1578-03 | – | B | 1579-03 | – | – | ↑L |
| 1579-03 | A | – | – | – | – | ↑L |
| 1588-02 | A | – | – | – | – | ↑□ |
| 1666-09 | A | – | – | 1677-05 | – | ↑□ |
| 1677-05 | A | – | – | – | – | ↑□ |
| 1777-02 | A | – | – | – | – | ×□ |
| 1888-02 | A | – | – | – | – | ×□ |

FIG. 17

900 PATCH DETAILS SCREEN

PATCH DETAILS (112841-07)

Patch Relationships

Depended-upon Patches (Patches that should be applied before this patch)

| Patch ID | Synopsis |
|---|---|
| 112233-05(112233-12) | SnOS 5.9: Kernel Patch |
| 112840-01(112233-12) | SnOS 5.9: Kernel Patch |
| 113445-01(112233-12) | SnOS 5.9: Kernel Patch |
| 114390-01(112233-12) | SnOS 5.9: Kernel Patch |

Dependent Patches (Patches that require this patch to be applied beforehand)
None

Peer Exclusive Patches (Patches that regard this patch as incompatible)
None

Exclusive Patches (Patches that this patch regards as incompatible)
None

Absorbing Patches (Patches that has abosorbed this patch)

| Patch ID | Synopsis |
|---|---|
| 112233-12 | SnOS 5.9: Kernel Patch |

Absorbed Patches (Patches absorbed by this patch)
112736-03

901 → (Depended-upon Patches)
902 → (Absorbing Patches)

PROGRAM AND METHOD FOR DISPLAYING RELATIONSHIPS BETWEEN OBJECTS

This application is a continuing application, filed under 35 U.S.C. §111(a), of International Application PCT/2006/301668, filed Feb. 1, 2006.

BACKGROUND OF THE INVENTION

1. Field of the Invention

The present invention relates to a program and a method for providing a view of relationships between objects. More particularly, the present invention relates to an object relationship display program and method for producing view data representing relationships between objects to be released for downloading.

2. Description of the Related Art

Many software vendors have their own web pages to allow customers to download their products or other various objects. Such objects released for downloading purposes include software patches (i.e., revision programs for released software), software products, and device drivers. The user selects a desired object in a web page that the vendor offers for object download purposes, and downloads the selected object to his/her terminal device.

Such web pages make various information available, which includes a list of downloadable objects, relationships between those objects, and other up-to-date information on the objects themselves. The relationships between objects include dependence, absorption, and exclusion, for example. Here, dependence between two objects refers to such a relationship that one object should not be installed until after the other object is installed. Absorption refers to such a relationship that one object has been absorbed by the other object. Exclusion refers to such a relationship that two objects cannot coexist in a single system. Accordingly, the user has to take inter-object relationships into consideration when downloading and installing objects, by consulting the description of each specific object, such as object relationship information and current status of each object.

FIG. 17 shows an example of a conventional web page that offers objects for downloading. The illustrated patch details screen 900 appears on a user's terminal device when he/she visits a website publishing downloadable objects and opens a specific web page providing details of patch "112841-07" in an attempt to download the patch.

This patch details screen 900 shows one-to-many relationships that the present patch "112841-07" bears to other patches. For example, the "Depended-Upon Patches" section 901 shows four patches on which the present patch depends. Likewise, the "Absorbing Patches" section 902 indicates that there is one patch that has absorbed the present patch. The patch details screen 900 further shows that there are no exclusive patches.

Structure tree is one of the suitable forms of representation for inter-object relationships such as dependence and absorption. That is, the relationships between objects can be visualized in structure tree form by mapping objects to nodes and their relationships to links between the nodes. When there is a change in the inter-object relationships, the tree has to be updated to reflect the change. To facilitate the editing of a structure tree, there is proposed a tree structure view editor (e.g., Japanese Unexamined Patent Application Publication No. 2002-140716, paragraph Nos. 0015 to 0022, FIG. 2).

Conventional web pages publishing downloadable objects show inter-object relationships in text form or table form as discussed in FIG. 17. This conventional technique provides sufficient information about one-to-one relationships or one-to-many relationships with respect to a specific object of interest. It is, however, difficult for the user to get the whole picture of related patches.

Since the conventional technique simply provides a list of relationships between two objects, the user has to trace the links of object relationships including dependence, absorption, and exclusion and combine the findings into an entire picture in his/her brain. This task is very time-consuming. Take patch "112841-07" in FIG. 17, for example. The "Depended-Upon Patches" section 901 tells the user that there are four patches "112233-05," "112840-01," "113445-01," and "114390-01" upon which the subject patch "112841-07" is dependent. If those patches have dependence relationships with other patches, the user has to consult the details of each such patch in an attempt to investigate their relationships. The user repeats this operation until he/she reaches an independent patch, expending considerable labor.

Since dependent objects cannot be installed until after installation of the objects that they depend upon, the user is required to do the burdensome tasks of identifying all the linked objects and downloading them individually. Moreover, when installing those downloaded objects, the user has to have clear idea of in what order the objects should be installed, not to violate their dependence relationships. This considerably raises the total burden imposed on the user. Particularly in the case of handling a large number of objects, there would be more chances of skipping necessary objects or selecting wrong objects during the download or installation.

Finding alternatives for an obsolete patch could also be a problem. Suppose, for example, that a user installed some patch in the past, but the patch was entered afterwards to a non-released state. In most such cases, the information about obsolete patches is no longer available for access. It is therefore difficult for the user to track down the latest patch corresponding to his/her patch.

Using a structure tree to visualize inter-object relationships would make it easier for the user to understand overall relationships between objects. However, the task of tracing the links of object relationships has conventionally been up to human operators, meaning that an additional workload of analyzing a structure tree is imposed on them. The tree structure view editor described in Japanese Unexamined Patent Application Publication No. 2002-140716, paragraph Nos. 0015 to 0022, FIG. 2 still requires the operator to take time and work to understand relationships between objects since it is rather designed to support editing work.

SUMMARY OF THE INVENTION

In view of the foregoing, it is an object of the present invention to provide a program and method for analyzing relationships between objects and providing users with an easy-to-understand view of overall object relationships.

To accomplish the above object, the present invention provides a computer-readable storage medium encoded with an object relationship display program for producing view data representing relationships between objects to be released for downloading, the object relationship display program causing a computer to function as: a data loader that reads object descriptors out of an object descriptor database and loads view-related object descriptors for display purposes into a predetermined working memory, the object descriptors describing status of each object which includes dependence relationships, absorption relationships, and exclusion relationships between the objects; a data sorter that sorts the view-related object descriptors in the working memory according to the relationship information so as to produce a group of view-related object descriptors of the objects having relationships described by the relationship information, and determining a hierarchy of the view-related object descriptors according to absorption relationships, while adding linkage symbols to link descriptors to represent linkage between view-related object descriptors, so as to create a structure tree representing the relationships between the objects; and a hierarchy view data builder that retrieves the view-related object descriptors, along with the link descriptors corresponding thereto, from the working memory according to the structure tree created by the data sorter, and saves the retrieved view-related object descriptors in a tree hierarchy database.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is shows an example of patch descriptors used in a web system according to the present embodiment.

FIG. 7 shows patch descriptors in a working memory after they have undergone a sorting process according to the present embodiment.

FIG. 8 shows patch descriptors in the working memory after they have undergone an absorption-based sort according to the present embodiment.

FIG. 9 shows patch descriptors in the working memory after they have undergone a dependence-based sort according to the present embodiment.

FIG. 10 shows patch descriptors in the working memory after they have undergone an exclusion-based sort according to the present embodiment.

FIG. 11 shows patch descriptors in the working memory after they have undergone a process of replacing link characters according to the present embodiment.

FIG. 17 shows an example of a conventional web page that offers objects for downloading.

DESCRIPTION OF THE PREFERRED EMBODIMENTS

Preferred embodiments of the present invention will be described below with reference to the accompanying drawings. The description begins with a concept of the present invention and then proceeds to a more specific embodiment of the invention.

Figure 1:
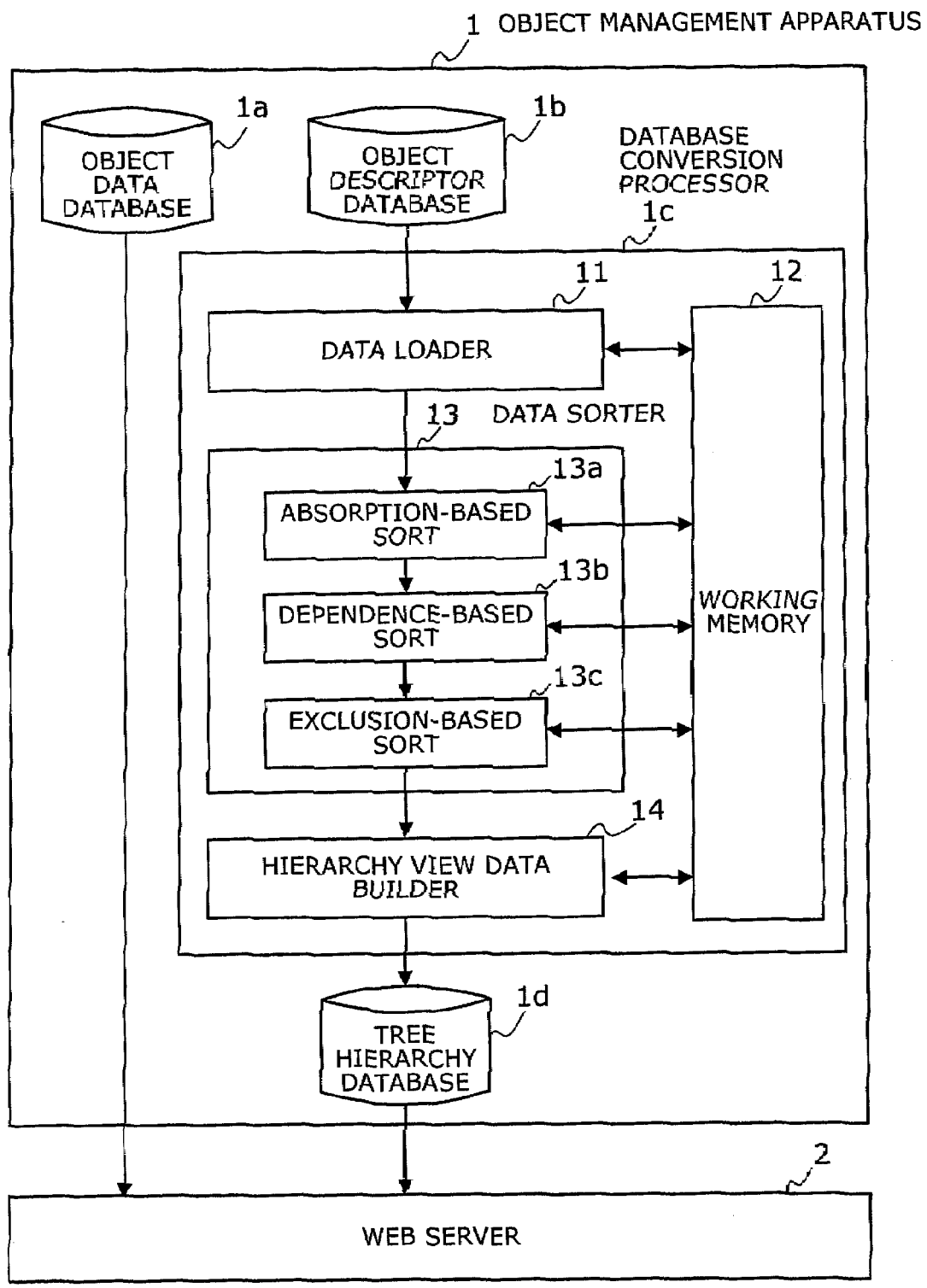
FIG. 1 is a conceptual view of the present invention, which may be variously embodied.

FIG. 1 is a conceptual view of the present invention, which may be variously embodied.

The present invention provides an object management apparatus 1 that includes an object data database 1*a* to store object data files, an object descriptor database 1*b* to store object descriptors including relationship information that describes relationships between objects, a database conversion processor 1*c* to convert a collection of object descriptors stored in the object descriptor database 1*b* into an ordered collection thereof so as to represent relationships between objects in hierarchical tree form, and a tree hierarchy database 1*d* to store the converted object descriptors for viewing purposes. The database conversion processor 1*c* is formed from a data loader 11 for loading object descriptors before they are sorted, a working memory 12 for use in sorting view-related object descriptors, a data sorter 13 for sorting view-related object descriptors, and a hierarchy view data builder 14 for outputting the converted view-related object descriptors. The processing functions of the data loader 11, data sorter 13, and hierarchy view data builder 14 are implemented as an object relationship display program for execution by a computer.

The object data database 1*a* stores object data files prepared for downloading purposes.

The object descriptor database 1*b* stores a descriptor of each object, which provides relationship information and status information. The relationship information describes an object's absorptive relationships, dependent relationships, and exclusive relationships with other objects. The state information of an object describes the current state of that object (e.g., whether it is in a released state). The object descriptor database 1*b* stores such object descriptors, together with corresponding object identifiers.

The tree hierarchy database 1*d* stores view-related object descriptors for use as source data of a tree diagram that represents inter-object relationships provided by the database conversion processor 1*c*.

The database conversion processor 1*c* offers the following functions.

The data loader 11 reads object descriptors out of the object descriptor database 1*b* and loads view-related object descriptors into the working memory 12. Those view-related object descriptors derive from object descriptors and include link descriptors and other necessary information for use in producing a view of object relationships. More specifically, view-related object descriptors may be a subset of object descriptors that are extracted as being necessary for creating a view. Or alternatively, view-related object descriptors may be the object descriptors themselves. During the loading process, link descriptors are initialized such that they indicate the topmost layer. Optionally, a linkage symbol representing "released" or "non-released" state may also be added to each link descriptor, depending on whether the corresponding object is currently released.

The working memory 12 is used by the data sorter 13 when it sorts view-related object descriptors.

The data sorter 13 sorts view-related object descriptors, based on the relationship information contained therein, such that the descriptors will be arranged into a tree hierarchy structure. The data sorter 13 also populates link descriptors during the sorting process. Relationships between objects include absorption relationships, dependence relationships, and exclusion relationships. The term "absorption relationship" refers to such a relationship where, for example, object A has absorbed object B. That is, object B cannot be installed once object A is installed. In this case, the relationship information of object A is supposed to contain information on the absorbed object B. The term "dependence relationship" refers to such a relationship where one has to install object B before installing object A. In other words, object A cannot be applied until after object B is applied. In this case, the relationship information of object A is supposed to contain information about object B, upon which object A is dependent. The term "exclusive relationships" refers to such a relationship where two objects A and B cannot exist together on the same system. Once one of such objects is installed, the other should never be installed. In this case, the relationship information of object A is supposed to contain information about object B, which object A regards as incompatible.

Based on such relationship information, the data sorter 13 executes an absorption-based sort 13a, a dependence-based sort 13b, and an exclusion-based sort 13c in that order.

The absorption-based sort 13a sorts view-related object descriptors in the working memory 12 according to absorption relationships described in their relationship information. Specifically, the absorption-based sort 13a performs this sorting in such as way that the view-related object descriptor of an object having an absorption relationship in its relationship information will be followed by the view-related object descriptor of the object described in that absorption relationship. Here, the former object is referred to as an "absorbing object," and the latter object is referred to as an "absorbed object." The absorption-based sort 13a also edits link descriptors of those objects such that the absorbed object will be placed below the absorbing object in the hierarchy of objects. More specifically, the absorption-based sort 13a adds a special linkage symbol to the link descriptor of the absorbed object so as to indicate that the absorbed object was moved to a lower layer of the hierarchy. In this way, a link descriptor gains more linkage symbols as its corresponding object descends toward the bottom of the hierarchy. In the case where the absorbed object has its subordinate group of lower-layer objects, the absorption-based sort 13a treats that parent object (i.e., the absorbed object) and its subordinate objects as a single group when performing sorting operations. The absorption-based sort 13a ends upon completion of processing all described absorption relationships.

The view-related object descriptors sorted according to absorption relationships of objects are then subjected to a dependence-based sort 13b. This dependence-based sort 13b sorts those view-related object descriptors in the working memory 12 according to dependence relationships described in their relationship information. Specifically, the dependence-based sort 13b performs this sorting in such a way that the view-related object descriptor of an object belonging to the group created by the absorption-based sort 13a and having a dependence relationship in its relationship information will be placed below the view-related object descriptor of the object described in that dependence relationship. Here the former object depends on the latter object, meaning that the former object cannot be installed until after the latter object is installed. The dependence-based sort 13b edits link descriptors of those objects accordingly. More specifically, it replaces an existing linkage symbol in the link descriptor with another linkage symbol representing dependencies (note that there are no movements between layers). In the case where the depended-upon object belongs to a specific group or has a lower-layer group, the dependence-based sort 13b sorts those groups together. The dependence-based sort 13b ends upon completion of processing all described dependence relationships.

The view-related object descriptors sorted according to absorption and dependence relationships of objects are then subjected to an exclusion-based sort 13c. The exclusion-based sort 13c sorts those view-related object descriptors in the working memory 12 according to exclusion relationships described in their relationship information. Specifically, the exclusion-based sort 13c performs this sorting in such as way that the view-related object descriptors of an object group including an object with an exclusion relationship described in its relationship information will be placed above the view-related object descriptor of the object described in that exclusion relationship. Here the former object cannot go together with the latter object (exclusive object). The exclusion-based sort 13c edits link descriptors of those objects by replacing an existing linkage symbol in the link descriptor with another linkage symbol representing exclusiveness (note that there are no movements between layers). In the case where the exclusive object belongs to a specific group or has a lower-layer group, the exclusion-based sort 13c includes those groups as the subject of sorting operations. The exclusion-based sort 13c ends upon completion of processing all described exclusion relationships.

The hierarchy view data builder 14 supplies the tree hierarchy database 1d with the view-related object descriptors and link descriptors that the data sorter 13 have processed in the working memory 12. During the course of this operation, the hierarchy view data builder 14 looks into the link descriptor of each view-related object descriptor, thus finding an object located at an end point of the tree. The hierarchy view data builder 14 then replaces the current linkage symbol of the link descriptor with a linkage symbol representing an end point. The data sorter 13 rearranges view-related object descriptors in the working memory 12 according to a tree hierarchy structure based on absorption, dependence, and exclusion relationships. The resulting view-related object descriptors and link descriptors can be used to produce a tree hierarchy view of inter-object relationships.

While the above sections have assumed that link descriptors are part of view-related object descriptors, those two kinds of descriptors may be implemented as separate pieces of information.

The following section will now describe the operation of the above object management apparatus 1, as well as explaining a method implemented therein to display inter-object relationships.

The object data database 1a stores object data files prepared for downloading purposes. In connection with this object data database 1a, the object descriptor database 1b stores descriptors of objects, which include relationship information indicating relationships between objects.

Upon activation of the database conversion processor 1c, its data loader 11 makes read access to the object descriptor database 1b to load view-related object descriptors including link descriptors into the working memory 12. The data loader 11 initializes link descriptors with a specific linkage symbol and, if necessary, gives an additional linkage symbol to indicate whether the object is in a released state or a non-released state. The data sorter 13 performs an absorption-based sort 13a based on absorption relationships described in relationship information, thereby arranging view-related object descriptors having a particular absorption relationships into a single group, as well as creating a hierarchical structure of objects by placing absorbed objects at a position one layer below the absorbing object. The data sorter 13 adds linkage symbols to the link descriptors of objects to indicate their absorption relationships and hierarchical structure. The view-related object descriptors sorted by the absorption-based sort 13a are then subjected to a dependence-based sort 13b. This dependence-based sort 13b combines view-related object descriptors of objects having dependence relationships into one group, while maintaining the groups produced in the absorption-based sort 13a. The data sorter 13 replaces an existing linkage symbol in relevant link descriptors with another linkage symbol representing dependencies. For example, the data sorter 13 replaces the linkage symbol at the top of a linkage descriptor. Lastly, the view-related object descriptors processed by the dependence-based sort 13b are subjected to an exclusion-based sort 13c. This exclusion-based sort 13c combines view-related object descriptors of objects having exclusion relationships into one group, while maintaining the groups produced in the absorption-based sort 13a and dependence-based sort 13b. The data sorter 13 then replaces an existing linkage symbol in relevant link descriptors with another linkage symbol representing exclusion relationships. The hierarchy view data builder 14 retrieves view-related object descriptors which are now arranged in the working memory 12 according to the tree hierarchy structure based on their absorption, dependence, and exclusive relationships. The retrieved view-related object descriptors are entered to the tree hierarchy database 1d.

The view-related object descriptors including link descriptors are transferred from the tree hierarchy database 1d to a web server 2, together with object data files retrieved from the object data database 1a. The web server 2 manages web pages for making objects available for download. Responsive to an access request from a user terminal, the web server 2 invokes a common gateway interface (CGI) to provide the requesting user terminal with a tree hierarchy view of object relationships, based on the view-related object descriptors sorted in accordance with their tree hierarchy structure.

Figure 2:
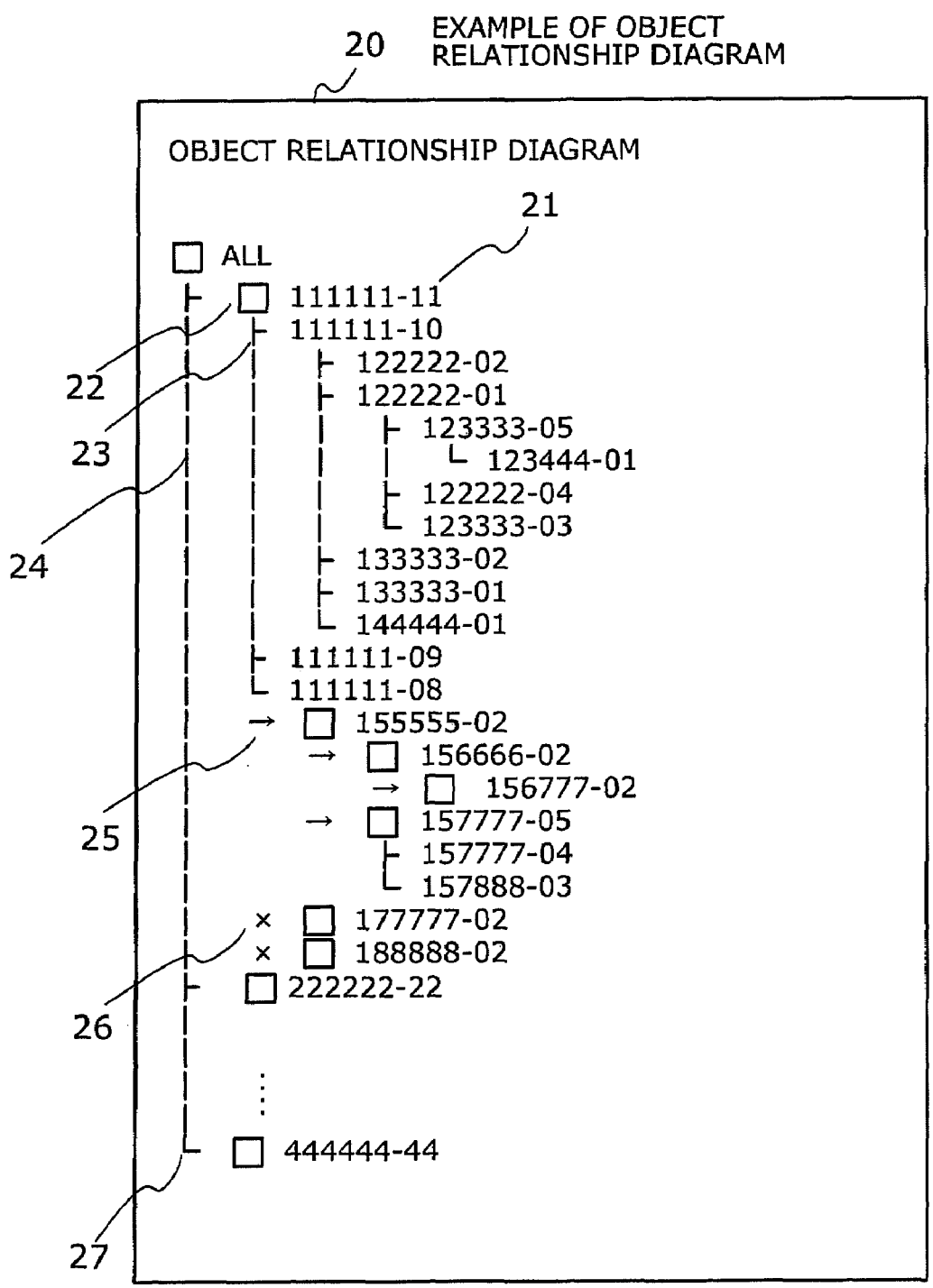
FIG. 2 shows an example of an object relationship diagram that gives a tree hierarchy view according to the present invention.

FIG. 2 shows an example of an object relationship diagram that gives a tree hierarchy view according to the present invention.

The illustrated object relationship diagram 20 is produced for viewing on a user terminal screen, according to view-related object descriptors transferred from the tree hierarchy database 1d in the object management apparatus 1 to the web server. Those view-related object descriptors have a tree hierarchy structure representing object relationships.

The example diagram shows object codes 21 indicating specific objects. Also shown are release marks 22, link characters (non-released) 23, link characters (hierarchy) 24, dependence marks 25, exclusion marks 26, and end marks 27. Those characters and symbols are placed in accordance with link descriptors.

Object codes 21 are unique identification numbers assigned to each object for identification purposes.

Release marks 22 indicate that the object is in a released state. Link characters (non-released) 23 indicate that the object is in a non-released state. These marks and characters are displayed in accordance with link symbols that the data loader 11 has added to link descriptors depending on the release status described in each object descriptor, before the data sorter 13 begins a sort. Link characters (hierarchy) 24 are displayed in accordance with link symbols that the absorption-based sort 13a has added to link descriptors of absorbed objects after its absorption-based sort is finished. Suppose, for example, that one object "111111-11" absorbs another object "122222-02". This absorption relationship causes the absorption-based sort 13a to adds a specific linkage symbol to the link descriptor of the absorbed object "122222-02" so as to indicate the fact that it has moved down to a lower layer. The display process places as many link characters (hierarchy) 24 as the number of linkage symbols, as well as indent-ing the corresponding object code according to that number. The display process also places a dependence mark 25 in accordance with a linkage symbol that the dependence-based sort 13b has given as a replacement symbol representing dependence relationships. An exclusion mark 26 is placed in accordance with a linkage symbol that the exclusion-based sort 13c has given as a replacement symbol representing exclusion relationships. An end mark 27 is placed in accordance with a linkage symbol that the hierarchy view data builder 14 has given as a replacement symbol representing an end point of the tree.

The object relationship diagram shows absorbed objects below absorbing objects, connecting them using link characters 23 and end marks 27. This diagram enables the user to see at a glance that, for example, one object "123333-05" are absorbed by two objects "122222-01" and "122222-02," and that those object "122222-01" and "122222-02" are absorbed by another object "111111-10." In this way, the user can see the revision history of the latest released object "111111-11." The user can also understand immediately what have happened to the objects that he/she downloaded to his/her terminal device in the past. The diagram helps him/her to plan what to do next.

Depended-upon objects follow their corresponding dependent object on the same layer, each indicated by a dependence mark 25. See object "111111-11," for example. This object "111111-11" has a dependence relationship with another object "155555-02," meaning that the former object "111111-11" cannot be installed until after the latter object "155555-02" is installed.

Exclusive objects follow their peer exclusive object on the same layer, each indicated by an exclusion mark 26. The user learns that, for example, object "111111-11" cannot exist together with object "177777-02."

As can be seen from the above example, the object management apparatus 1 produces an object relationship diagram from view-related object descriptors, so as to visualize the relationships between objects in the form of a tree hierarchy structure. This diagram not only shows a relationship between two objects, but also gives a whole picture of inter-object relationships.

With the above-described tree diagram showing object relationships, the user can select a desired object and download it. The user can also select and download a particular partial tree or the entire tree of objects in a single operation. Suppose, for example, that the user specifies object "111111-11" for downloading. In this case, the object management apparatus 1 further selects other downloadable objects "155555-02," "156666-02," "156777-02," and "157777-05" that constitute a partial tree of the specified object. The object management apparatus 1 may be configured to analyze their dependence relationships automatically and sort them in the order that they should be applied. In the present example, the dependence relationships dictate that the released objects "156777-02," "156666-02," "157777-05," "155555-02," and "111111-11" be installed in that order. Accordingly, the object management apparatus 1 sorts those objects in the above order before presenting them to the user for downloading.

The proposed object management apparatus 1 obviates the need for repeating selection and download operations, or for being careful of the order of objects to be installed, thus alleviating operator workload. It also prevents necessary download objects from being overlooked by mistake.

The following section will now describe a specific embodiment of the invention with reference to several drawings. This embodiment applies to web pages for publishing downloadable software patches.

Figure 3:
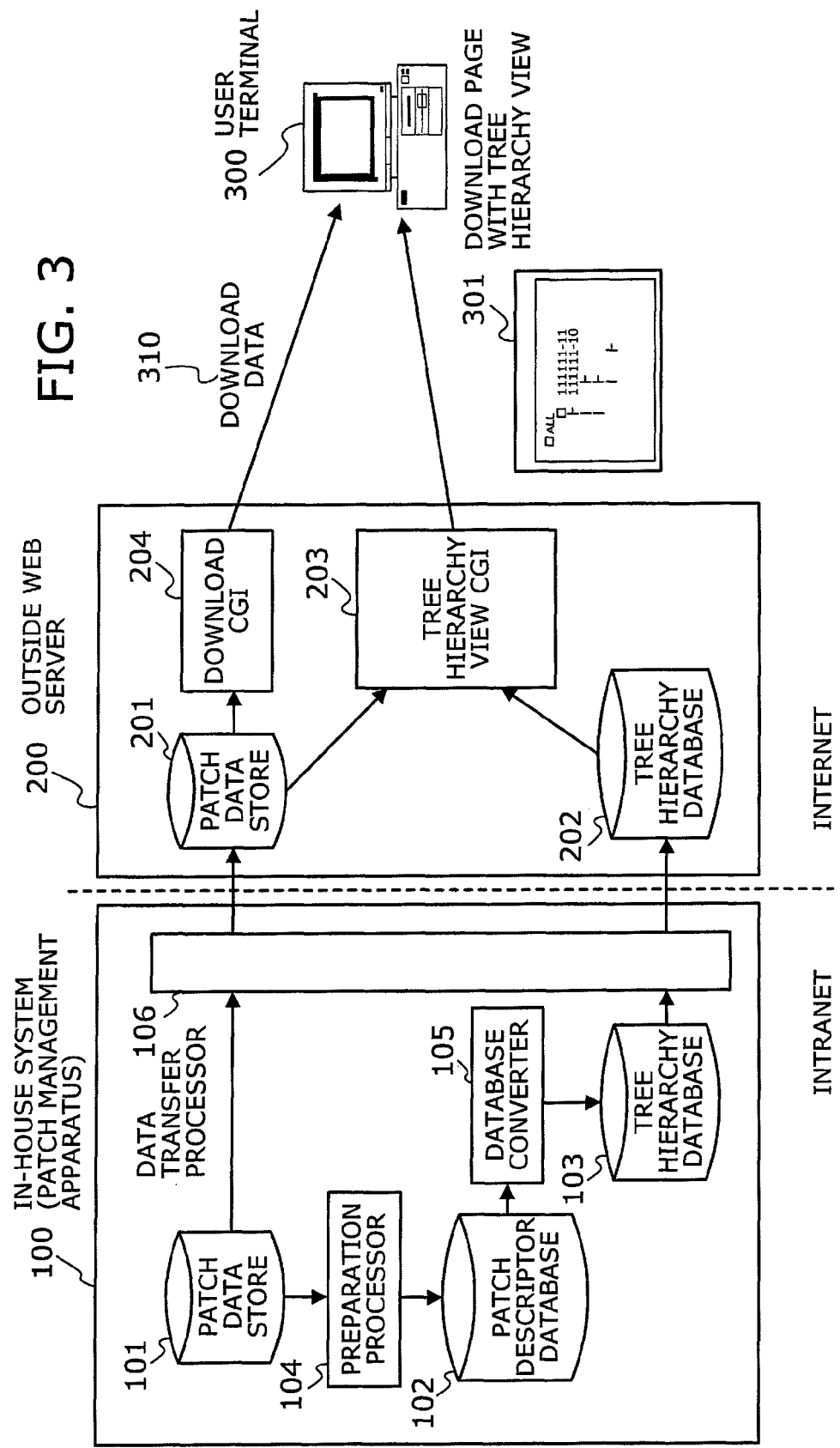
FIG. 3 shows an example configuration of a web system to which the present embodiment is applied.

FIG. 3 shows an example configuration of a web system to which the present embodiment is applied.

The illustrated web system includes an in-house system (patch management apparatus) 100 providing downloadable patches, together with information to be published on web pages. Also included are an outside web server 200 that provides such web pages, and a user terminal 300 operated by a user. The user terminal 300 is connected to the outside web server 200 via the Internet. The in-house system (patch management apparatus) 100 communicates with the outside web server 200 via a firewall, besides being connected to an intranet.

The in-house system 100 serves as a patch management apparatus that manages patches. To this end, the in-house system 100 includes storage devices for uses as a patch data store 101, a patch descriptor database 102, and a tree hierarchy database 103. Also included are processing elements such as a preparation processor 104, a database converter 105, and a data transfer processor 106. Those processing functions are implemented as computer programs running on a computer platform. The patch management apparatus 100 may be realized a multiple-computer system.

The patch data store 101 stores a collection of downloadable patches. The patch descriptor database 102 stores a collection of patch descriptors, which includes each patch's identifier, relationship information describing dependence, absorption, and exclusion relationships, current state of each patch, and storage address of patch data. The tree hierarchy database 103 stores a collection of display data used to visualize relationships between patches in the form of a tree diagram. The preparation processor 104 prepares patch descriptors based on patch data to be downloaded. The database converter 105 sorts and converts those patch descriptors into display data for later use in producing a tree diagram representing relationships between patches. The data transfer processor 106 transfers the patch data and display data to the outside web server 200 over the network.

The outside web server 200 has storage devices for use as a patch data store 201 and a tree hierarchy database 202. In response to an access request from the user terminal 300, the outside web server 200 sends a download page 301 with a tree hierarchy view through a tree hierarchy view CGI 203, where CGI stands for Common Gateway Interface. The outside web server 200 also sends, on request, download data 310 through a download CGI 204.

The user terminal 300 functions as a web client to interact with the outside web server 200. Specifically, the user terminal 300 displays a download page 301 with a tree hierarchy view, based on data received from the outside web server 200. It also sends user inputs to the outside web server 200.

This system allows operators (e.g., author of patches) to register patch data with the patch data store 101 in the in-house system (patch management apparatus) 100 in order to make them available for download by users. Based on such patch data, the preparation processor 104 prepares relationship information describing dependence, absorption, and exclusion relationships between patches. This relationship information is entered to the patch descriptor database 102. The database converter 105 analyzes the relationship information stored in the patch descriptor database 102 to produce display data for visualizing relationships between patches in the form of a tree hierarchy structure, which will ultimately be output as a download page 301 with a tree hierarchy view. The data transfer processor 106 reads out stored data of the patch data store 101 and tree hierarchy database 103 for delivery to the outside web server 200. To publish the patches, the outside web server 200 saves received patch data in its patch data store 201, as well as storing received display data in its tree hierarchy database 202 for use in producing a patch tree diagram.

When an access request is received from a user terminal 300, the outside web server 200 invokes a tree hierarchy view CGI 203 to analyze the display data stored in the tree hierarchy database 202, thus compiling a download page 301 in the Hyper Text Markup Language (HTML) format. This download page 301 contains a tree hierarchy view that shows dependence, absorption, and exclusive relationships between patches in tree hierarchy form. The outside web server 200 responds to the requesting user terminal 300 by sending the download page 301. The user terminal 300 outputs the received download page 301 on a monitor screen, thus permitting the user to see what patches are available for downloading and how they are related with each other. Upon selection of a particular patch by the user, the download page 301 calls up a download CGI 204. This download CGI 204 reads corresponding patch data out of the patch data store 201 and sends it out to the user terminal 300.

The in-house system 100 has a database converter 105 to produce display data of tree diagrams beforehand. This preparatory work avoids imposing excessive workload on the outside web server 200. That work may, however, be executed on the outside web server 200 if the system environment allows.

Figure 4:
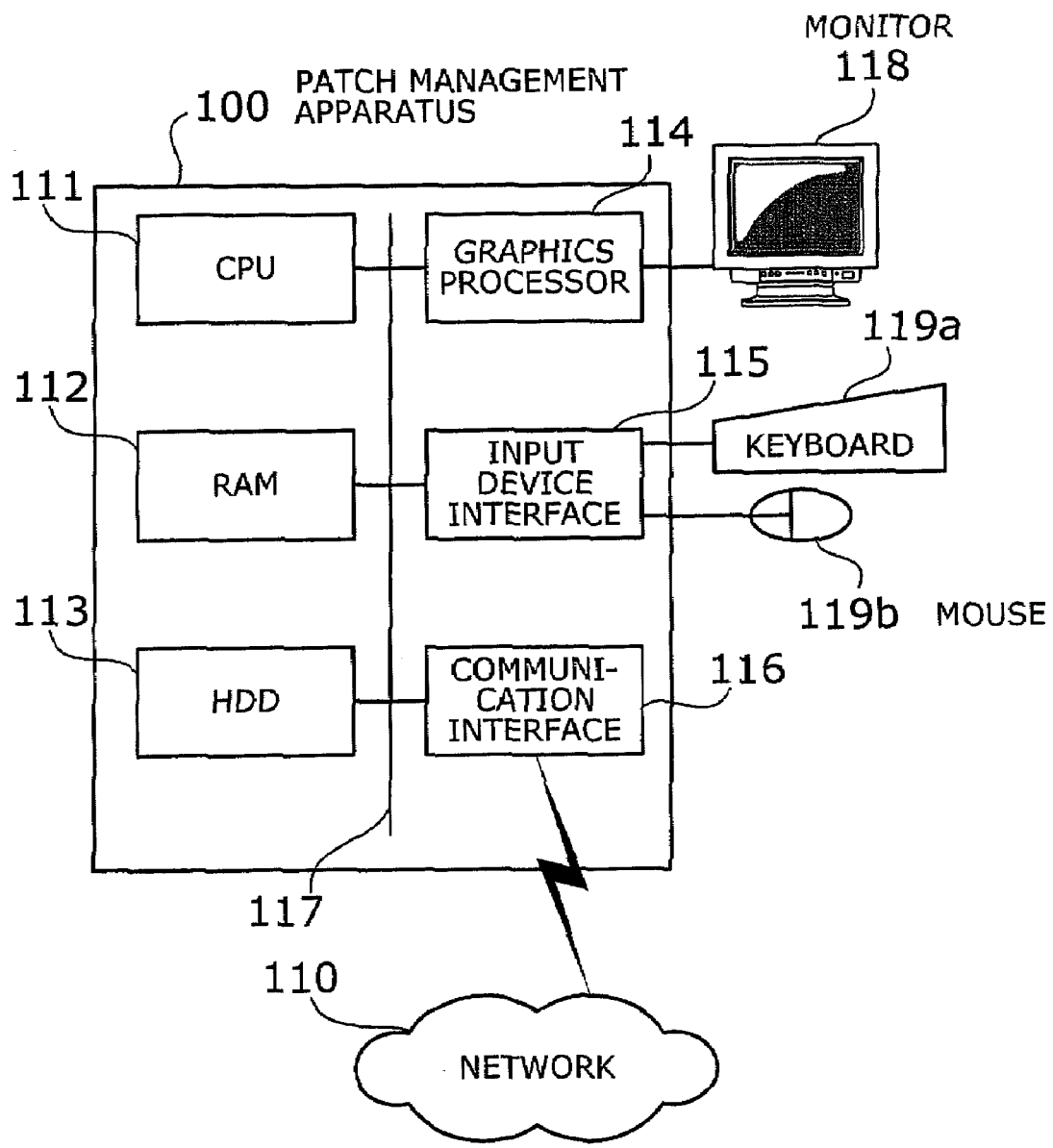
FIG. 4 is a block diagram showing an example hardware configuration of a patch management apparatus according to the present embodiment.

Referring to the block diagram of FIG. 4, an example hardware configuration of the patch management apparatus 100 will now be described below.

According to the present embodiment, the patch management apparatus 100 is totally controlled by a central processing unit (CPU) 111. Coupled to this CPU 111 through a bus 117 are: a random access memory (RAM) 112, a hard disk drive (HDD) 113, a graphics processor 114, an input device interface 115, and a communication interface 116.

The RAM 112 serves as temporary storage for the whole or part of operating system (OS) programs and application programs that the CPU 111 executes, in addition to other various data objects manipulated at runtime. The HDD 113 stores operating system programs and various application programs. The graphics processor 114 is coupled to a monitor 118. The graphics processor 114 produces video images in accordance with commands from the CPU 111 and displays them on a screen of the monitor 118. Coupled to the input device interface 115 are a keyboard 119a and a mouse 119b. The input device interface 115 receives signals from the keyboard 119a and mouse 119b and supplies them to the CPU 111 via the bus 117. The communication interface 116 is connected to a network 110, allowing the CPU 111 to exchange data with terminal devices via the network 110.

The above-described hardware platform is used to realize the processing functions of the present embodiment. As mentioned earlier, the patch management apparatus 100 may be implemented as a in-house system with two or more devices having similar hardware configurations. While FIG. 4 shows an example hardware configuration of the proposed patch management apparatus, the illustrated hardware design may also be applied to the outside web server 200 and user terminal 300.

The following section describes how the patch management apparatus 100 works in the web system of FIG. 3, as well as explaining a method of providing a view of object relationships.

The patch management apparatus 100 activates its preparation processor 104 to produce patch descriptors corresponding to the entries of the patch data store 101. The resulting descriptors are saved in a patch descriptor database 102. Details of those patch descriptors will be given below.

FIG. 5 is shows an example of patch descriptors used in the web system according to the present embodiment.

The illustrated patch descriptors 400 are each formed from the following data fields: patch ID field 401, release status field 402, bad patch field 403, absorbed patch field 404, depended-upon patch field 405, exclusive patch field 406, and description field 407. If required, the patch descriptors 400 may have other data fields to contain, for example, an address that indicates where in the patch data store 101 the corresponding patch data is stored. Such data fields are added to the patch descriptors 400, depending on the system's requirements.

The patch ID field 401 contains a code used to distinguish a corresponding patch from others. This code is changed each time the patch experiences revision or absorption. In the present example, a unique four-digit number is assigned as a base patch ID, which is followed by a hyphen and a two-digit number representing revisions. Specifically, the lower two-digit part is incremented by one when a new version of the patch is released. The release status field 402 contains a symbol "A" to indicate that the corresponding patch is currently in a released state. Another symbol "-" in this field indicates that the patch is in a non-released state. The bad patch field 403 contains a symbol "B" to indicate that the patch is no longer available due to some problems of its own. Other patches have a symbol "-" in this data field.

The absorbed patch field 404, depended-upon patch field 405 and exclusive patch field 406 of a specific patch show its relationships with other patches. Specifically, if the patch has absorbed some other patches, its absorbed patch field 404 contains patch IDs of those absorbed patches. If the patch depends on some other patches (i.e., the patch cannot be applied before those other patches), its depended-upon patch field 405 contains patch IDs of those other patches. If the patch is not compatible with some other patches (i.e., the patch cannot exist together with those other patches), its exclusive patch field 406 contains patch IDs of those other patches.

Take a released patch "1111-11," for example. The corresponding patch descriptor 400 shows that patch "1111-11" has absorbed three patches "1222-02," "1333-02," and "1444-01." The patch descriptor 400 also shows that patch "1111-11" is dependent on two patches "1555-02" and "1666-09" and cannot coexist with patches "1777-02" and "1888-02."

The description field 407 gives a brief description of what functions each patch offers.

Patch descriptors carrying such information are stored in the patch descriptor database 102, and they are subjected to the database converter 105 each time there is a change in their contents. The following section will describe a process performed by the database converter 105, with reference to a flowchart.

Figure 6:
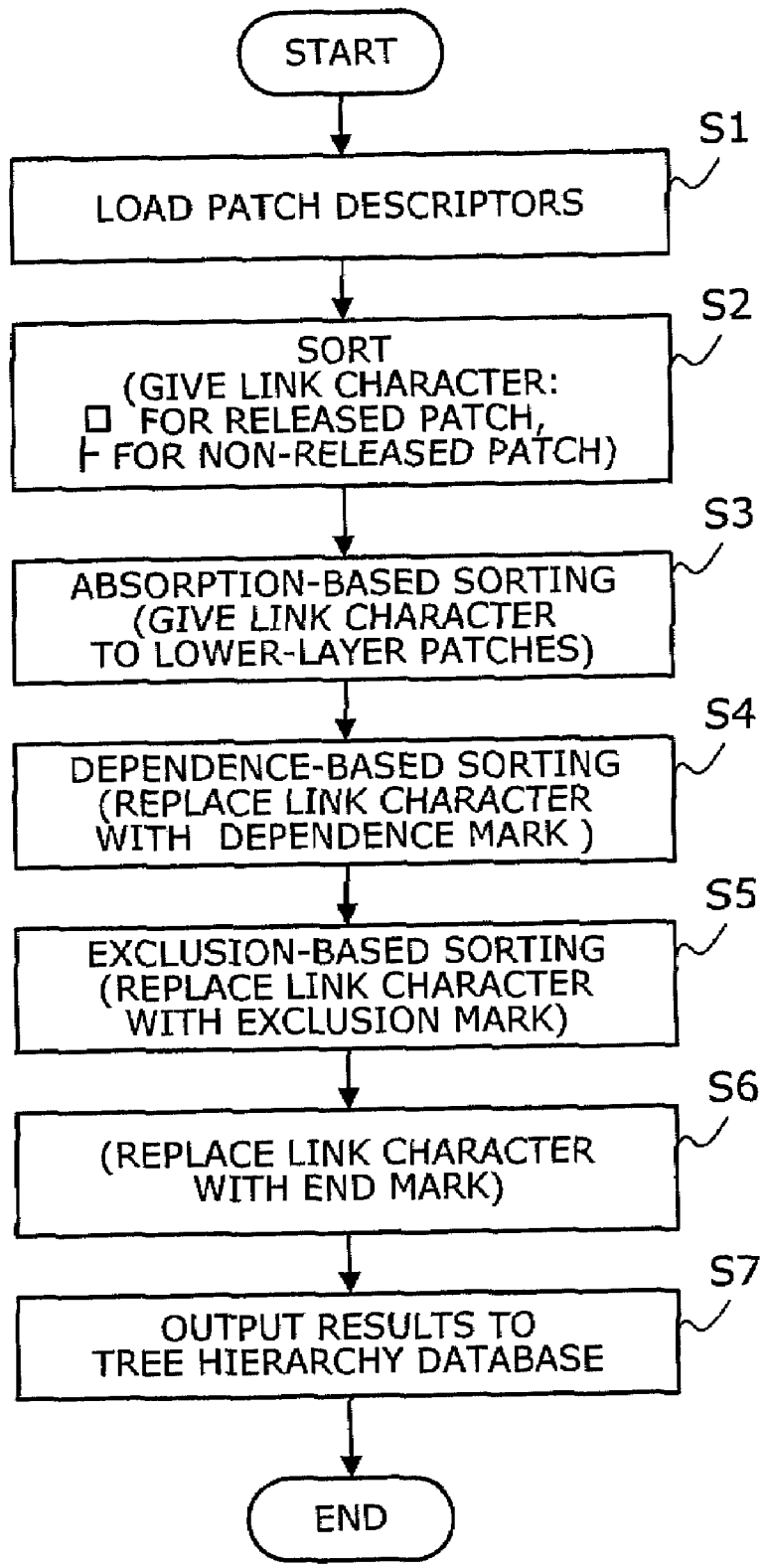
FIG. 6 is a flowchart showing a process executed by a database converter according to the present embodiment.

FIG. 6 is a flowchart showing a process executed by the database converter according to the present embodiment. The text in parentheses describes what each step does to link descriptors.

(Step S1) The database converter 105 reads patch descriptors out of the patch descriptor database 102 and loads them into a working memory. The loaded data will be used at the outside web server 200 to compile a page for viewing. As one possible implementation, the database converter 105 may extract only necessary part of patch descriptors and add link descriptors thereto. In the present embodiment, however, the database converter 105 first loads all data fields (including release status, bad patch, absorbed patch, depended-upon patch, and exclusive patch fields) of patch descriptors into the working memory and adds an additional link descriptor field to each patch descriptor.

(Step S2) The database converter 105 sorts patch descriptors, so that its final outcome (i.e., tree diagram) will be easy to understand. The database converter 105 then initializes link descriptors. Note that the patch descriptors 400 discussed in FIG. 5 have been sorted in ascending order of version number, for each group of patches sharing a common base patch ID. However, it would be more intuitive if they were arranged in descending order since it is usually the case that patches with larger version numbers are published. Accordingly, the database converter 105 sorts patch descriptors in descending order of their version numbers, for each group of patches sharing a common base patch ID, such that the latest version comes first in each group. During the course of this sorting, the database converter 105 inserts a link character to each link descriptor, thereby initializing them. The database converter 105 also consults the release status field 402 to determine whether each patch is released. Specifically, a release mark is added if the release status field 402 indicates a released state. Otherwise, a link character indicating a non-released state is added.

(Step S3) The database converter 105 sorts patch descriptors according to the absorption relationships described in the absorbed patch field 404, which contains patch IDs of absorbed patches. This step S3 is executed for each group of patches sharing a common base patch ID. Suppose, for example, that a patch belonging to such a group (referred to as "group A") has an absorbed patch field 404 describing another group of patches (referred to as "group B"). The database converter 105 examines each absorbed patch field 404 of group A to determine whether there is any patch ID of group B. If there is, the database converter 105 rearranges the patch descriptors by inserting group B to a position below the oldest of the group-A patches containing group-B patches. In the case where group B is followed by another group ("group C") in a lower layer, the database converter 105 moves both group B and group C as data elements constituting a partial tree. To indicate the fact that the partial tree of groups B and C is positioned one layer below group A, the database converter 105 adds a link character to their link descriptors. The above processing is applied to each every absorption relationship described in the patch descriptors 400. The partial tree formed from the above-described group A and its subordinate groups B and C is referred to herein as "tree A."

(Step S4) The database converter 105 sorts patch descriptors, based on the depended-upon patch field 405, which indicates patches that have to be installed before the present patch. As in step S3, this step S4 is executed for each group of patches sharing a common base patch ID. Specifically, the database converter 105 examines each depended-upon patch field 405 of group A to determine whether there is any patch ID of other group D. If there is, the database converter 105 moves tree D containing group D to below tree A containing group A. Tree D refers to a partial tree containing group D, which is a group of patches formed at step S3 on the basis of absorption relationships. To indicate the dependence relationship between tree A and the moved tree D, the database converter 105 replaces a link character in the middle of relevant link descriptors with a dependence mark, or a character representing dependencies. The depended-upon patch field 405 of group D may contain a patch ID of other group E. If this is the case, the database converter 105 moves group E, together with group D, by inserting tree E containing group E at the bottom of tree D containing group D. The above processing is applied to each every dependence relationship described in the patch descriptors 400.

(Step S5) The database converter 105 sorts patch descriptors, based on the exclusive patch field 406, which indicates patches that cannot coexist with the present patch. As in step S4, this step S5 is executed for each group of patches sharing a common base patch ID. Specifically, the database converter 105 examines each exclusive patch field 406 of group A to determine whether there is any patch ID of other group F. If there is, the database converter 105 moves tree F containing group F to below tree A containing group A. To indicate the exclusion relationship between tree A and the moved tree F, the database converter 105 replaces a link character in the middle of relevant link descriptors with an exclusion mark, or a character representing exclusiveness. The exclusive patch field 406 of group F may contain a patch ID of other group G. If this is the case, the database converter 105 moves both group F and G, together with group F, by inserting tree G containing group G at the bottom of tree F containing group F. The above processing is applied to each every exclusion relationship described in the patch descriptors 400.

(Step S6) The database converter 105 reads the patch descriptors sequentially in the order that they are sorted in the working memory at steps S3, S4, and S5. If a patch at an end of the tree is encountered, the database converter 105 replaces its link character with an end mark, or a character representing an end point of the tree.

(Step S7) The database converter 105 outputs the resulting patch descriptors from the working memory to the tree hierarchy database 103, thus concluding its processing.

Through the above steps, the database converter 105 sorts patch descriptors loaded in a working memory, according to absorption, dependence, and exclusion relationships between patches, adds link descriptors to the sorted patch descriptors, and outputs them to the tree hierarchy database 103 for use as display data representing relationships between patches in the form of a structure tree.

A more specific example will be presented below to explain detailed operations of each step.

First, step S1 loads patch descriptors by reading out patch descriptors (FIG. 5) from the patch descriptor database 102 and writes them in a working memory without changing their order while adding a link descriptor field. It is assumed that the patch descriptors have been sorted in the order of ASCII code.

Step S2 then sorts the patch descriptors loaded in the working memory in descending order of version numbers, for each group of patches sharing a common base patch ID. Step S2 also initializes their link descriptor field based on the release status of corresponding patches.

FIG. 7 shows patch descriptors in a working memory after they have undergone a sorting process according to the present embodiment. Note this diagram omits the description field 407 shown in FIG. 5.

Loaded in the working memory are patch descriptors 500a each formed from the following data fields: patch ID field 501, release status field 502, bad patch field 503, absorbed patch field 504, depended-upon patch field 505, exclusive patch field 506, and link descriptor field 507. Those data fields correspond to those shown in FIG. 5, except for the link descriptor field 507, which is added.

The sorting process handles patches with a common base patch ID as a group and sorts patches in each group in descending order of version number. For example, as a result of sorting group A 510 with a base patch ID of "1111," the patch with the largest version number "11" comes first, which is followed by other patches with smaller version numbers. Patch "1111-11" having "A" (released) in its release status field 502 is given a link character and a release mark (box) as its link descriptor. Non-released patch "1111-10" is only given link characters for its link descriptor. Likewise, link descriptors of other patch descriptors are initialized with link characters.

Then Step S3 executes an absorption-based sort, which rearranges the patch descriptors 500a in the working memory according to their absorption relationships.

The sorting process looks into group A 510, for example, and notices that some of their absorbed patch fields 504 specify patch "1222-02" as an absorbed patch. Since group B 511 has the same base patch ID as this patch, the sorting process puts that group B 511 below the oldest of the group-A patches that have a group-B patch in their absorbed patch fields 504. In the present example, group B 511 is moved to the position right below patch "1111-10." A link character is then added to the link descriptors of the moved group B 511 to indicate the fact that group B 511 is placed at the layer right below group A 510. Since group B 511 specifies patch "1233-05" in their absorbed patch fields 504, and since group C 512 has the same base patch ID as this patch, the sorting process puts group C 512 below the group-B patch "1222-01." The sorting process then gives a link character to the link descriptors of the patches belonging to group C 512, in addition to the existing link character representing its current layer position that is level with group B 511. The sorting process also finds that the absorbed patch field 504 of patch "1233-05" in group C 512 specifies patch "1234-01," the base patch ID of which is shared by group D 513. The sorting process thus moves group D 513 to the position right below the group-C patch "1233-05," as well as giving an additional link character to its link descriptor as in the case of group C 512.

FIG. 8 shows patch descriptors in the working memory after they have undergone an absorption-based sort according to the present embodiment. Since FIGS. 7 and 8 bear some similarities, like reference numerals are used to refer to like elements.

As a result of the absorption-based sort described above, a hierarchical structure has emerged in the sorted patch descriptors 500b, where group A with a common base patch ID "1111" contains groups B, C, and D according to their absorption relationships. Specifically, group D 513 (G-D in FIG. 8) has been absorbed by group C with a common base patch ID "1233," thus forming a partial tree C 523 (T-C in FIG. 8; the same notation applies to other trees). Further, tree C 523 is absorbed by group B with a common base patch ID "1222," thus forming tree B 521. Likewise, tree B 521 is absorbed by group A, thus forming tree A 520. Appropriate link characters have been added to the link descriptors in accordance with the tree structure. For example, an additional link character is given to patches belonging to tree B 521, under the uppermost tree A 520, and yet another link character is given to patches belonging to tree C 523, so that the hierarchical structure will be reflected in their link descriptors. Tree E 524 and tree F 525 are produced as a result of similar processing on the subsequent patches.

The patch descriptors 500b sorted by the above absorption-based sort is then subjected to a dependence-based sort at step S4, which rearranges those patch descriptors 500b according to their dependence relationships.

Specifically, the sorting process looks into tree A 520 and notices that one of their depended-upon patch fields 505 names patch "1555-02" belonging to tree F 525. Accordingly, tree F 525 has to be located below tree A 520. This is already done in the illustrated example; no additional changes are needed in the arrangement of patch descriptors. To indicate tree A's dependence on patch "1555-02," the sorting process replaces a link character in its link descriptor with a dependence mark. A similar operation applies to patch "1666-09" appearing in a depended-upon patch field 505 of tree A 520. That is, patch "1666-09" is placed to the position next to tree F 525 under tree A 520, with its link descriptor updated with a dependence mark. Likewise, the sorting process finds patch "1567-02" appearing in the depended-upon patch field 505 of patch "1566-02" in tree F 525. This patch "1567-02" is placed below patch "1566-02," and its link descriptor is updated accordingly. Since patch "1566-02" has no subordinate groups, patch "1567-02" can take the position immediately below "1566-02."

FIG. 9 shows patch descriptors in a working memory after they have undergone a dependence-based sort according to the present embodiment. Since FIGS. 7-9 bear some similarities, like reference numerals are used to refer to like elements.

As a result of the dependence-based sort described above, tree F 525 and patch "1666-09" are located below tree A 510 of sorted patch descriptors 500c. Tree F contains patch "1555-02" on which tree A 510 depends. The link descriptors of patches "1555-02" and "1666-09" now contain a dependence mark given as a replacement of their link characters. Also, tree G 526 has been formed according to the depended-upon patch field 505 of patch "1555-02". Likewise, tree H 527 has been formed according to the depended-upon patch field 505 of tree A 520, where tree H 527 contains tree A 520 and tree G 526 as its partial trees.

The patch descriptors 500c sorted by the above dependence-based sort is then subjected to an exclusion-based sort at step S5, which rearranges those patch descriptors 500c according to their exclusion relationships.

Specifically, the sorting process looks into tree H 527 and finds exclusive patches in their exclusive patch fields 506. Those exclusive patches are supposed to be below tree H 527. In the illustrated example, the sorting process places patches "1777-02" and "1888-02" at a position below tree H 527, as well as replacing their link characters with an exclusion mark.

FIG. 10 shows patch descriptors in the working memory after they have undergone an exclusion-based sort according to the present embodiment. Since FIGS. 7-10 bear some similarities, like reference numerals are used to refer to like elements.

As a result of the above exclusion-based sort, tree 1528 is created in the sorted patch descriptors 500d, the tree including patches "1777-02" and "1888-02" which have exclusion relationships with respect to tree H 527 (although the arrangement of descriptors does not change in the illustrated example).

Then step S6 replaces link characters of the patch descriptors 500d that have undergone the above exclusion-based sorting process. Specifically, the replacement process reads out each patch descriptor 500d to check its link characters. The process replaces one of the link characters with an end mark if that patch descriptor is located at an end point of the tree. This condition can be tested by, for example, comparing the link descriptor field 507 of the present patch and that of the next line. If the layer of the latter is level with or lower than the present patch's, it means that the present patch is not at an end point.

The replacement process compares, for example, patch "1233-05" with patch "1234-01" on the next line. Since patch "1234-01" is lower than patch "1233-05" in terms of their hierarchical levels, patch "1233-05" is found not to be at an end point of the tree. Then the replacement process compares patch "1234-01" with patch "1233-04" on the next line. Since patch "1233-04" is higher than patch "1234-01" in terms of their hierarchical levels, the process determines that patch "1234-01" is at an end point, thus replacing its link character with an end mark. The replacement process repeats the above operations to find every end-point patch and give an end mark to its link descriptor.

FIG. 11 shows patch descriptors in the working memory after they have undergone a process of replacing link characters according to the present embodiment.

As a result of the replacement process described above, all end-point patches in the patch descriptors 500e have an end mark in place of their link characters. Those end-point patches are: "1234-01," "1233-03," "1444-01," "1111-08," "1577-04," "1578-03," and "1579-03."

The patch descriptors 500e produced by the above-described steps are then subjected to step S7. This step S7 outputs the patch descriptors 500e to a tree hierarchy database 103. The data transfer processor 106 further transfers them to the outside web server 200 for storage in a remote tree hierarchy database 202.

The outside web server 200 is responsive to an access request from a user terminal 300. Upon receipt of such a request, the tree hierarchy view CGI 203 produces and sends a download page 301 with a tree hierarchy view for the purpose of browsing at the requesting user terminal 300.

The tree hierarchy view CGI operates as follows.

Figure 12:
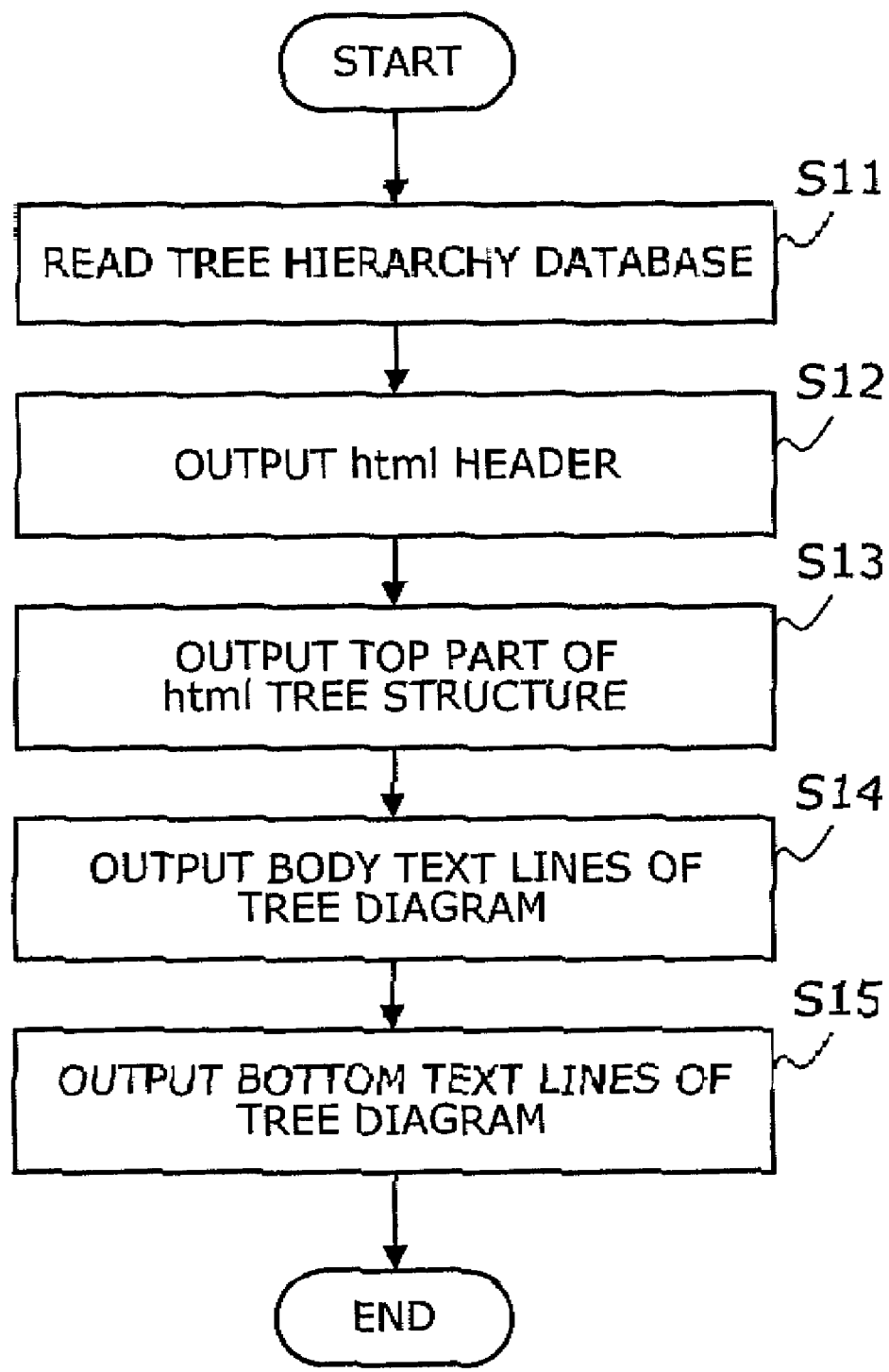
FIG. 12 is a flowchart of a tree hierarchy view CGI according to the present embodiment.

FIG. 12 is a flowchart of the tree hierarchy view CGI according to the present embodiment.

(Step S11) The tree hierarchy view CGI reads patch descriptors out of the tree hierarchy database 202 to a memory.

(Step S12) The tree hierarchy view CGI creates a header of a html document. Specifically, the tree hierarchy view CGI produces html tags such as <html> and <head>, as well as some components to be displayed at a top portion of the page, such as site policy logos and breadcrumbs.

(Step S13) The tree hierarchy view CGI produces and outputs data for the top portion of a html tree structure view. The top portion should includes, among others, a subject line, a batch download button, an individual download button, and a check box for "ALL" patches. The batch download button allows the operator to download necessary patches all together. When this button is selected, a download CGI is invoked with a parameter designating batch download mode. The individual download button, on the other hand, allows the operator to download patches one by one. When this individual download is selected, a download CGI is invoked with a parameter designating individual download mode. The operator may select the check box "ALL" to select the whole set of patches. The web page should be designed to indicate the fact that this selection is made.

(Step S14) The tree hierarchy view CGI outputs body text lines of a tree diagram that shows relationships between patches in tree structure form. Specifically, the tree hierarchy view CGI reads and processes each line of tree-structured patch descriptors loaded in the memory at step S11. The tree hierarchy view CGI performs this for as many records as the database stores, as will be described in detail later.

(Step S15) The tree hierarchy view CGI produces bottom text lines of the html document, along with other necessary elements such as html tags </head> and </html>.

The following section will explain a process of producing body text lines.

Figure 13:
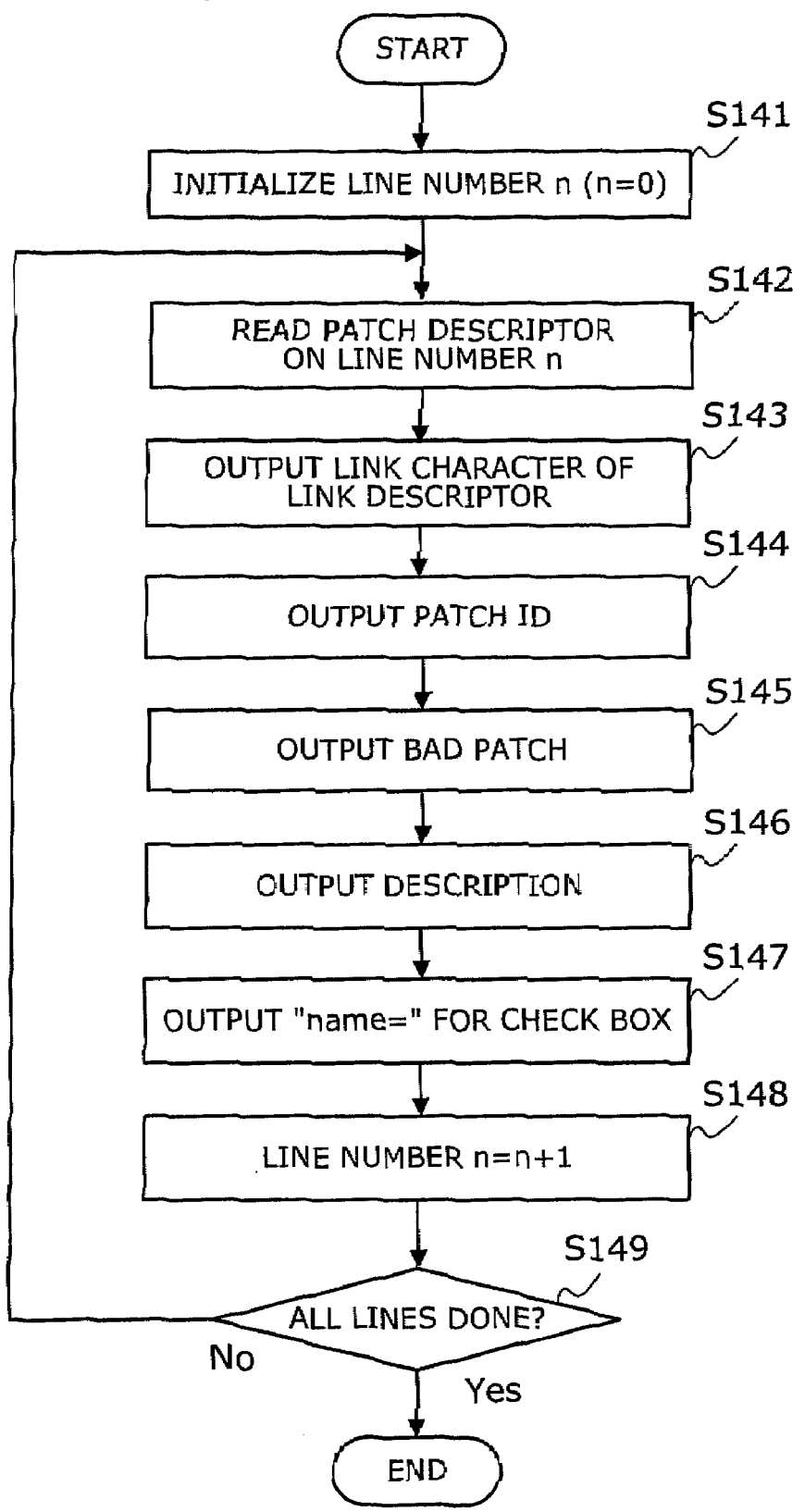
FIG. 13 is a flowchart shown how the tree hierarchy view CGI produces body text lines according to the present embodiment.

FIG. 13 is a flowchart shown how the tree hierarchy view CGI produces body test lines according to the present embodiment.

(Step S141) The tree hierarchy view CGI initializes a line number n to zero (i.e., n=0), meaning that n points to the top line for reading.

(Step S142) The tree hierarchy view CGI reads a patch descriptor on line number n. As can be seen from FIG. 11, each patch descriptor is formed from a patch ID field 501, release status field 502, bad patch field 503, absorbed patch field 504, depended-upon patch field 505, exclusive patch field 506, and link descriptor field 507 (and a description field, which is not shown in FIG. 11).

(Step S143) The tree hierarchy view CGI outputs link characters based on the link descriptor field of the patch descriptor read at step S142. In the case where the patch descriptor has a value of "A" (released) in its release status field and contains a release mark as a link character, the tree hierarchy view CGI replaces the release mark with a check box before outputting it.

(Step S144) The tree hierarchy view CGI outputs a patch ID according to the patch ID field of the patch descriptor read at step S142.

(Step S145) The tree hierarchy view CGI checks the bad patch field of the patch descriptor read at step S142. If it contains a value of "B" (bad patch), the tree hierarchy view CGI outputs "B" subsequent to the patch ID to indicate that the patch is a bad patch.

(Step S146) The tree hierarchy view CGI reads the description field of the patch descriptor read at step S142 and outputs the text of that functional description as is.

(Step S147) The tree hierarchy view CGI outputs a unique "name=" attribute, so that the user can see whether the check box is selected.

(Step S148) The tree hierarchy view CGI increments the line number n by one (i.e., n=n+1).

(Step S149) The tree hierarchy view CGI determines whether all lines have been finished. If not finished, the process returns to step S142 to select and process the next line.

As a result of the above steps, a download page 301 with a tree hierarchy view appears on the user terminal 300.

Figure 14:
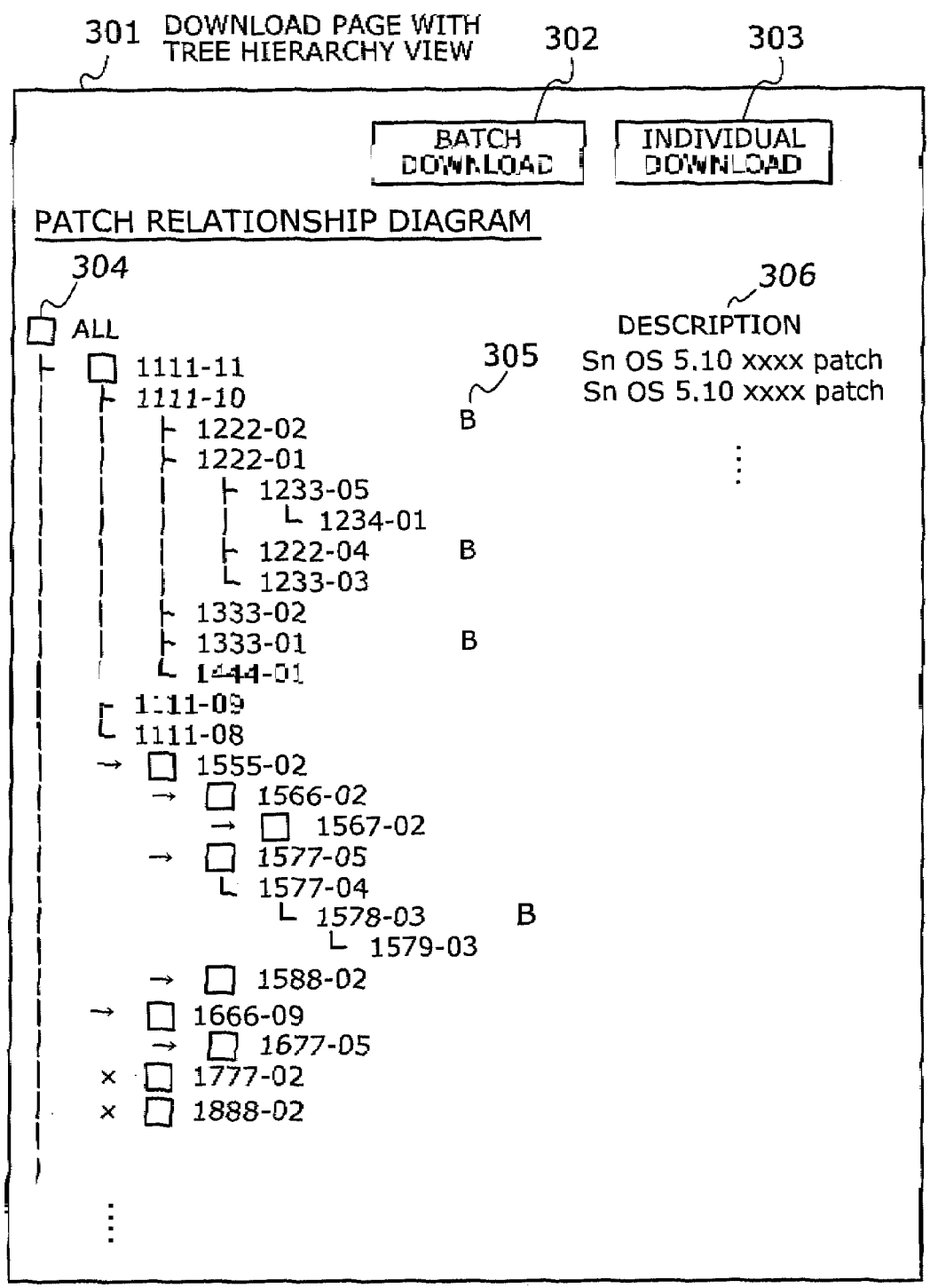
FIG. 14 shows an example of a download page with a tree hierarchy view according to the present embodiment.

FIG. 14 shows an example download page with a tree hierarchy view according to the present embodiment. This page uses the same symbols (e.g., link characters, dependence marks, and exclusion marks) that have been explained in FIG. 2.

The topmost part of the illustrated download page 301 gives a batch download button 302 and an individual download button 303, together with a subject line. The body of the page gives a tree diagram showing relationships between patches. Absorbed patches are listed below their corresponding absorbing objects, connected with link symbols. Older versions are shown on the same layer as the patches absorbed by a younger version. Depended-upon patches are shown with a dependence mark, located below the patch that needs them. Exclusive patches are shown below a peer exclusive patch, each given an exclusion mark. Those exclusive patches are equal in terms of their hierarchical levels.

Check boxes 304 in front of some patch IDs indicate that the corresponding patches are released for downloading. That is, the user can request them in this page by pressing the downloading button. The character "B" 305 beside some patch IDs means that those patches are bad patches. Descriptions 306 explain the function of patches briefly.

The above-described download page 301 provides a tree hierarchy view to facilitate understanding of overall relationships between patches, including their dependence, absorption, and exclusion relationships. The download page 301 also makes it easy for the user to find which patches he/she has to install. Suppose, for example, that the user installed patch "1222-04" in the past. The download page 301 tells him/her that the patch "1222-04" is no longer available as being a bad patch. He/she thus traces the tree diagram on the page and learns that he/she can solve his/her problem by installing patch "1111-11" as an alternative.

Patches are downloaded as follows. The user specifies necessary patches by selecting their check boxes on the download page 301. Pressing an individual download button 303 permits him/her to download the specified patches in a conventional way.

Pressing a batch download button 302 instead will let the system pick up other necessary patches automatically and download them altogether with a single action.

Figure 15:
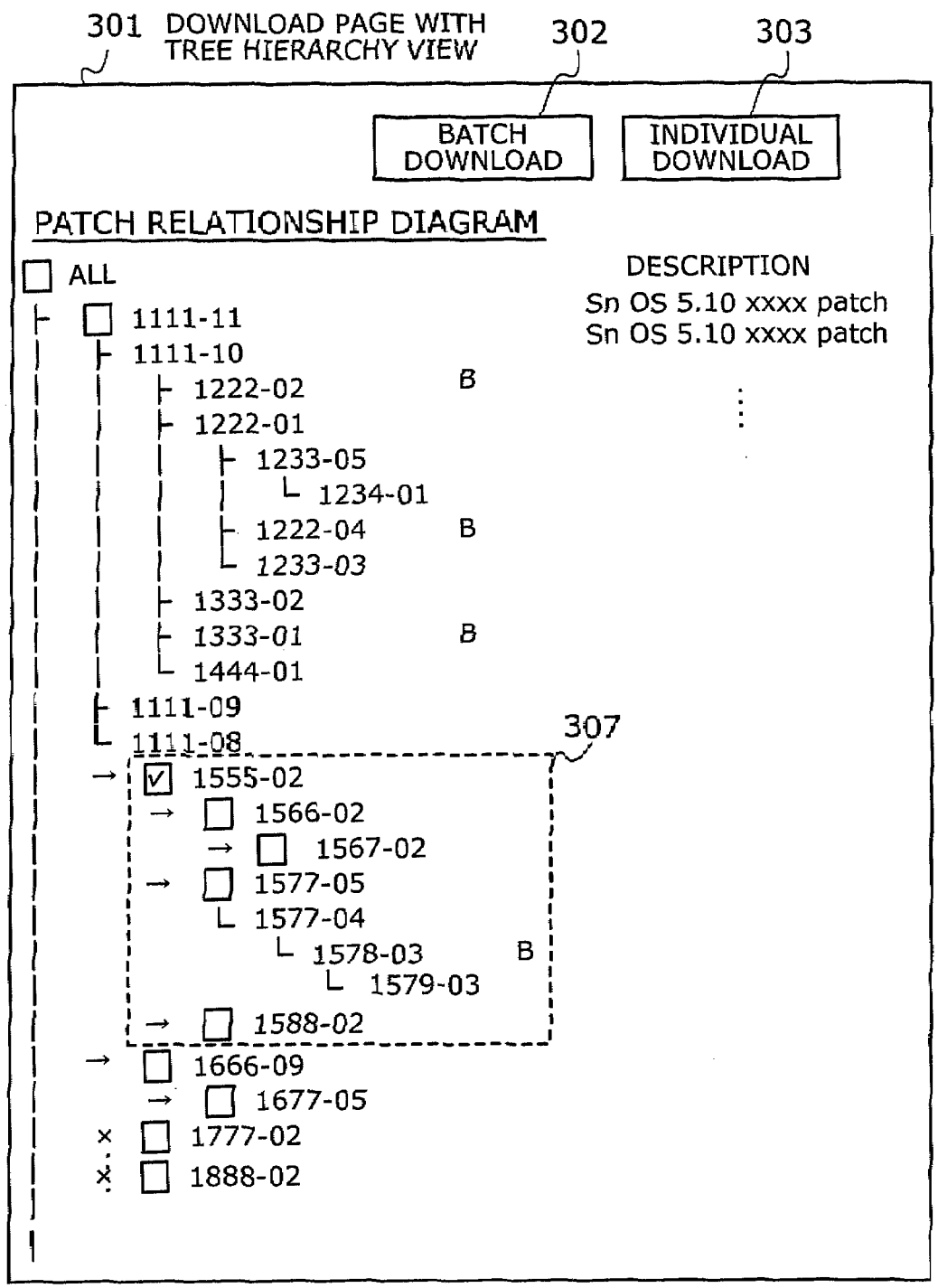
FIG. 15 shows the case where batch download is selected in the download page according to the present embodiment.

FIG. 15 shows the case where batch download is selected in the download page according to the present embodiment.

Suppose, for example, that the operator has selected the check box of patch "1555-02" and pressed the batch download button 302. That action causes patch "1555-02" and its partial tree 307 to be selected together. The partial tree 307 contains four patches "1566-02," "1567-02," "1577-05," and "1588-02," on which the selected patch "1555-02" depends. Those patches can therefore be downloaded altogether, wherein the patch data files are sorted to ensure the correct order of patches in a subsequent installation process.

The above download operation is executed by a download CGI that is invoked upon depression of the batch download button 302 or the individual download button 303.

The download CGI operates as follows.

Figure 16:
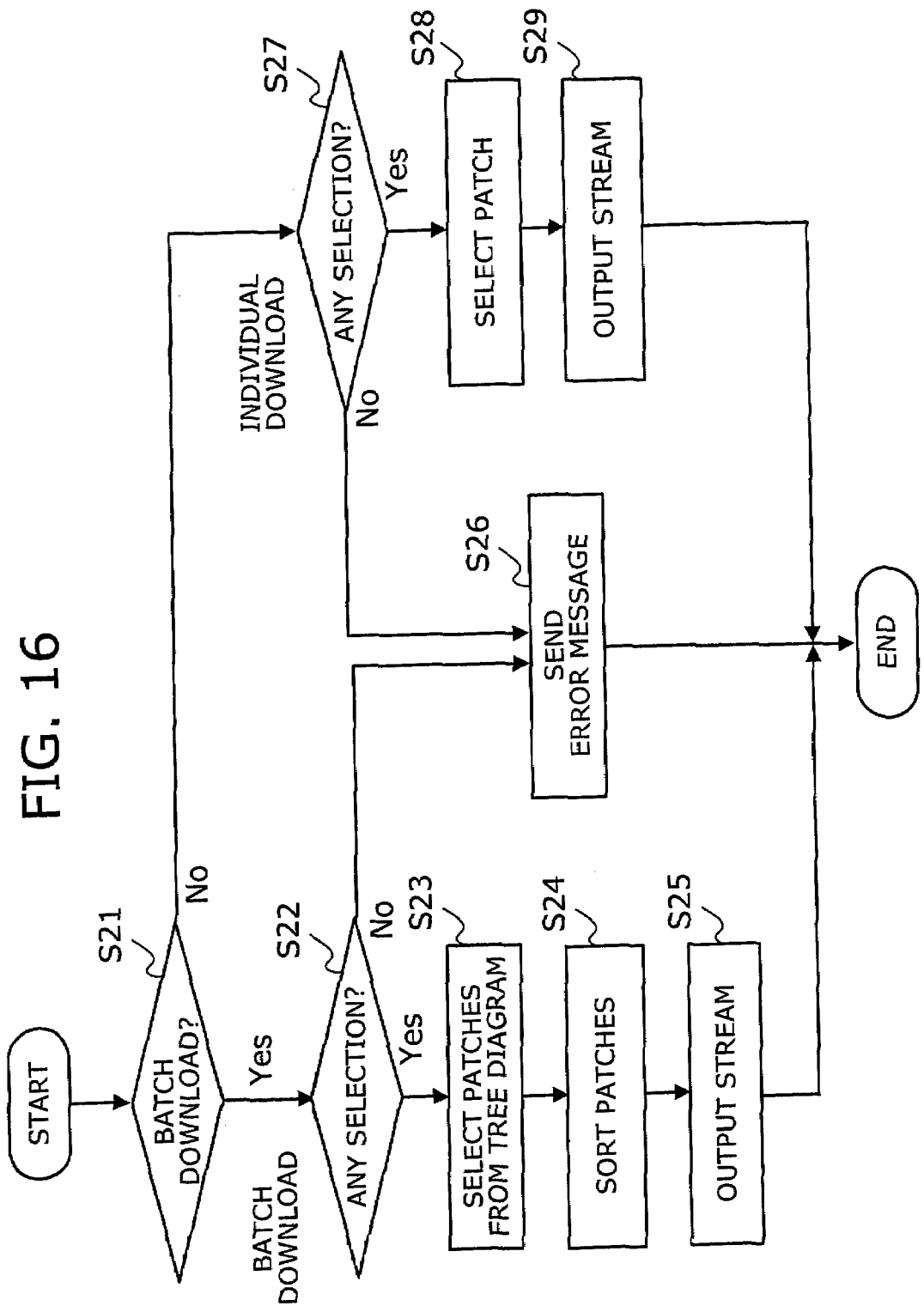
FIG. 16 is a flowchart of the download CGI according to the present embodiment.

FIG. 16 is a flowchart of a download CGI according to the present embodiment.

Suppose that the user has selected a check box of a desired patch and pressed either the batch download button 302 or individual download button 303. That action invokes a download CGI with some parameters indicating which check box (i.e., which patch ID) and which download button (i.e., batch or individual) the user has selected.

(Step S21) The download CGI checks the given parameters to determine which download button has been pressed. The process advances to step S27 if it is an individual download button.

(Step S22) Since it is determined that the user has pressed a batch download button, the download CGI begins a batch download as follows. First of all, it makes sure that there are patch IDs with their check boxes selected. The absence of such selections causes the process to proceed to step S26.

(Step S23) Now that the parameters include specific patch IDs (i.e., their corresponding check boxes are selected), the download CGI consults the tree diagram to include every other patch that has a dependence relationship with the selected patches. In the case where the "ALL" check box is checkmarked, the download CGI interprets it as selection of all released patches.

(Step S24) The download CGI sorts the patches selected at step S23, according to the order that they should be installed. The tree diagram lists depended-upon patches in the order of dependencies, where the one at the bottom should be the first to apply. Sorting those patches from the bottom to the top will therefore yield an ordered list of patches for correct installation. Accordingly, the download CGI is designed to sort the selected patches in that order. It also produces a separate list of patches to describe in what sequence they should be applied.

(Step S25) The download CGI outputs a stream of patches, together with the sequence list created at step S24, so that the client can download the patches sorted at step S24. The download CGI then terminates itself.

(Step S26) Since no patch ID check boxes are selected, the download CGI outputs an error message and terminates itself.

(Step S27) Since it is determined that the user has pressed an individual download button, the download CGI begins an individual download as follows. First of all, it makes sure that there are patch IDs with their check boxes selected. The absence of such selections sends the process to step S26.

(Step S28) Now that the parameters include specific patch IDs (i.e., their corresponding check boxes are selected), the download CGI selects all those patches. See step S23 for the case where the "ALL" check box is checkmarked.

(Step S29) The download CGI outputs a stream of patches, so that the client can download the patches selected at step S28. The download CGI then terminates itself.

The steps described above permit the user to select and download patches shown in the tree diagram. The selection may be a single patch, a partial tree of patches, or the entire tree of patches. No matter what kind of selection method is used, the download can be executed as a single action. The downloaded patches are already arranged in the order of installation, and the operator receives a sequence list for installation. The operator no longer needs to investigate the correct sequence. The present embodiment thus prevents necessary patches from being overlooked by mistake.

While the above sections have assumed patches as an example application, it is apparent that the present invention can also be applied to other objects, such as software products or device drivers. Software products, for example, are often associated with each other, which may be described as dependence, absorption, and exclusion relationships. Dependence relationships between software products refer to, for example, the case where one product A cannot be installed until after another product B is installed. Absorption relationships refers to, for example, the case where one product A is now obsolete since it was replaced by another product B. Exclusion relationships refer to, for example, the case where two products A and B are not allowed to coexist in a single system.

The above-described processing functions of the present invention are actually implemented on a computer system. Each specific function of the proposed object management apparatus is coded and made available in the form of computer programs. A computer system executes such programs to provide the foregoing processing functions. Those programs may be stored in a computer-readable medium. Suitable computer-readable storage media include magnetic storage devices, optical discs, magneto-optical storage media, and semiconductor memory devices, for example. Magnetic storage devices include hard disk drives (HDD), flexible disks (FD), and magnetic tapes, for example. Optical disc media include digital versatile discs (DVD), DVD-RAM, compact disc read-only memory (CD-ROM), CD-Recordable (CD-R), and CD-Rewritable (CD-RW). Magneto-optical storage media include magneto-optical discs (MO), for example.

Portable storage media, such as DVD and CD-ROM, are suitable for distribution of program products. Network-based distribution of software programs may also be possible, in which case the program files are made available on a server computer for downloading to other computers via a network.

A computer stores programs in its local storage unit, which have previously been installed from a portable storage media or downloaded from a server computer. The computer executes those programs read out of the local storage unit, thereby performing the programmed functions. As an alternative way of program execution, the computer may execute programs, reading out program codes directly from a portable storage medium. Another alternative method is that the user computer dynamically downloads programs from a server computer when they are demanded and executes them upon delivery.

According to the present invention, the proposed process displays relationships between objects by rearranging view-related object descriptors based on relationship information describing inter-object relationships, such that they will form a structure tree representing such relationships. With the resulting collection of view-related object descriptors and link descriptors, a tree diagram is produced to show, in structure tree form, the relationships between objects that are released for download by the users. Besides permitting the user to understand the relationships between each two objects, this tree diagram provides them with a whole picture of dependence, absorption, and exclusion relationships between objects. This feature helps the user to determine which objects to download and install, thus greatly reducing the workload of planning a download procedure. Particularly in the case where the user needs to download multiple objects, the above feature aids him/her to understand the entirety of object relationships, thus preventing necessary objects from being overlooked by mistake.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable storage medium encoded with an object relationship display program for producing view data representing relationships between objects to be released for downloading, the object relationship display program causing a computer to perform a procedure comprising:

reading object descriptors out of an object descriptor database and loading view-related object descriptors for display purposes into a predetermined working memory, the object descriptors describing dependence relationships and absorption relationships between the objects including first to third objects, wherein the first object has an absorption relationship with the second object, meaning that the first object has absorbed the second object, and presence of the first object prevents installation of the second object, and wherein the first object has a dependence relationship with the third object, meaning that the third object has to be installed before the first object;

sorting the view-related object descriptors in the working memory according to the absorption and dependence relationships, and determining a hierarchy of the view-related object descriptors according to the absorption relationships, while adding a first linkage symbol to link descriptors to represent linkage between the view-related object descriptors, so as to create a structure tree representing the absorption relationships between the objects;

placing, in the structure tree representing the absorption relationships between the objects including the first and second objects, the third object with which the first object has the dependence relationship, together with a second linkage symbol that indicates the dependence relationship therebetween and is distinguishable from the first linkage symbol representing the absorption relationship of the first object with the second object, the third object being positioned at the same hierarchical level as the first object in the structure tree; and retrieving the view-related object descriptors, along with the link descriptors corresponding thereto, from the working memory according to the created structure tree and saving the retrieved view-related object descriptors in a tree hierarchy database, wherein the object descriptors further describe exclusion relationships between objects that are not allowed to coexist in a single computing environment, and the sorting comprises:

first sorting the view-related object descriptors in the working memory, based on the absorption relationships described in the relationship descriptors, so as to form a group of view-related object descriptors corresponding to an absorbing object and absorbed objects, creating a hierarchy of the view-related object descriptors by moving those of the absorbed objects at a position below that of the absorbing object, and saving the resulting view-related object descriptors in the working memory while adding to the link descriptors the first linkage symbol representing the absorption relationships;

second sorting the view-related object descriptors that the first sorting has sorted in the working memory, based on the dependence relationships described in the relationship descriptors, such that the view-related object descriptors of objects having the dependence relationships will be in a single group, and saving the resulting view-related object descriptors in the working memory while adding to the link descriptors the second linkage symbol representing the dependence relationships; and third sorting the view-related object descriptors that the second sorting has sorted in the working memory, based on the exclusion relationships described in the relationship descriptors, such that the view-related object descriptors of objects having the exclusion relationships will be in a single group, and saving the resulting view-related object descriptors in the working memory while adding to the link descriptors a third linkage symbol representing the exclusion relationships.

2. The computer-readable storage medium according to claim 1, wherein the adding of the first linkage symbol representing absorption relationships to the link descriptors is performed each time the moving of view-related object descriptors takes place in accordance with the absorption relationships between the objects.

3. The computer-readable storage medium according to claim 1, wherein the sorting moves a view-related object descriptor in the structure tree and, when that view-related object descriptor is a root of a partial tree, moves all view-related object descriptors belonging to the partial tree, in addition to the root view-related object descriptor.

4. The computer-readable storage medium according to claim 1, wherein the procedure further comprises:
examining the view-related object descriptor of each object to determine whether the object is in a released state;
giving a fourth linkage symbol indicating the released state, to the link descriptor of each object in the released state; and
giving a fifth linkage symbol indicating linkage to other objects, to the link descriptor of each object in a non-released state.

5. The computer-readable storage medium according to claim 1, wherein:
the loading loads the view-related object descriptors in descending order of version numbers thereof; and
the sorting based on the link descriptors begins with a topmost one of the loaded view-related object descriptors.

6. The computer-readable storage medium according to claim 1, wherein the saving of the retrieved view-related object descriptors examines the link descriptor in each view-related object descriptor and gives a sixth linkage symbol representing an end point to the link descriptor of the view-related object descriptor located at an end point of the structure tree.

7. The computer-readable storage medium according to claim 1, wherein the procedure further comprises:
selecting, responsive to a user request specifying one of the objects for batch download, download data of every object corresponding to the view-related object descriptors located below the specified object in the structure tree of the view-related object descriptors in the tree hierarchy database.

8. The computer-readable storage medium according to claim 7, wherein the procedure further comprises:
sorting data files of the objects selected for the batch download, based on the dependence relationships described in the object descriptors, so that the data files will be arranged in a correct order of application.

9. An object relationship display method for producing view data representing relationships between objects to be released for downloading, the object relationship display method comprising:
reading object descriptors out of an object descriptor database and loading view-related object descriptors for display purposes into a predetermined working memory, the object descriptors describing dependence relationships and absorption relationships between the objects including first to third objects, wherein the first object has an absorption relationship with the second object, meaning that the first object has absorbed the second object, and presence of the first object prevents installation of the second object, and wherein the first object has a dependence relationship with the third object, meaning that the third object has to be installed before the first object;

sorting the view-related object descriptors in the working memory according to the absorption and dependence relationships, and determining a hierarchy of the view-related object descriptors according to the absorption relationships, while adding a first linkage symbol to link descriptors to represent linkage between the view-related object descriptors, so as to create a structure tree representing the absorption relationships between the objects;

placing, in the structure tree representing the absorption relationships between the objects including the first and second objects, the third object with which the first object has the dependence relationship, together with a second linkage symbol that indicates the dependence relationship therebetween and is distinguishable from the first linkage symbol representing the absorption relationship of the first object with the second object, the third object being positioned at the same hierarchical level as the first object in the structure tree; and retrieving the view-related object descriptors, along with the link descriptors corresponding thereto, from the working memory according to the created structure tree and saving the retrieved view-related object descriptors in a tree hierarchy database, wherein the object descriptors further describe exclusion relationships between objects that are not allowed to coexist in a single computing environment, and the sorting comprises:

first sorting the view-related object descriptors in the working memory, based on the absorption relationships described in the relationship descriptors, so as to form a group of view-related object descriptors corresponding to an absorbing object and absorbed objects, creating a hierarchy of the view-related object descriptors by moving those of the absorbed objects at a position below that of the absorbing object, and saving the resulting view-related object descriptors in the working memory while adding to the link descriptors the first linkage symbol representing the absorption relationships;

second sorting the view-related object descriptors that the first sorting has sorted in the working memory, based on the dependence relationships described in the relationship descriptors, such that the view-related object descriptors of objects having the dependence relationships will be in a single group, and saving the resulting view-related object descriptors in the working memory while adding to the link descriptors the second linkage symbol representing the dependence relationships; and third sorting the view-related object descriptors that the second sorting has sorted in the working memory, based on the exclusion relationships described in the relationship descriptors, such that the view-related object descriptors of objects having the exclusion relationships will be in a single group, and saving the resulting view-related object descriptors in the working memory while adding to the link descriptors a third linkage symbol representing the exclusion relationships.

* * * * *